(12) United States Patent
Williford et al.

(10) Patent No.: US 12,034,241 B2
(45) Date of Patent: Jul. 9, 2024

(54) ENCLOSURE AND OPTIMIZATIONS

(71) Applicant: Schneider Electric USA, Inc., Andover, MA (US)

(72) Inventors: Matthew Alan Williford, Nashville, TN (US); Edgar Avalos Ortiz, Murfreesboro, TN (US); Amol Shrirang Bagaitkar, Mount Juliet, TN (US); Eldridge R. Byron, Murfreesboro, TN (US); Sergio Flores, Smyrna, TN (US); Bhushan Kumbalwar, Smyrna, TN (US); Gregory O. Motley, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/559,974

(22) Filed: Dec. 22, 2021

(65) Prior Publication Data

US 2022/0209516 A1 Jun. 30, 2022

Related U.S. Application Data

(60) Provisional application No. 63/131,341, filed on Dec. 29, 2020.

(51) Int. Cl.
*H01R 13/18* (2006.01)
*H01H 1/62* (2006.01)
(Continued)

(52) U.S. Cl.
CPC ............... *H01R 13/18* (2013.01); *H01H 1/62* (2013.01); *H01R 13/53* (2013.01); *H02B 1/20* (2013.01); *H02B 1/56* (2013.01); *H02B 13/00* (2013.01)

(58) Field of Classification Search
CPC ......... H02B 1/56; H01R 13/18; H01R 13/187
See application file for complete search history.

(56) References Cited

U.S. PATENT DOCUMENTS

| 3,201,551 A | 8/1965 | Mercier |
| 3,662,137 A | 5/1972 | Cleaveland |

(Continued)

FOREIGN PATENT DOCUMENTS

| CN | 101483115 A | 7/2009 |
| CN | 201435311 Y | 3/2010 |

(Continued)

OTHER PUBLICATIONS

English Machine Transation of Wang, CN 201435311 Y dated Mar. 31, 2010, translated on Apr. 22, 2023 (Year: 2023).*

(Continued)

*Primary Examiner* — Robert J Hoffberg
(74) *Attorney, Agent, or Firm* — Locke Lord LLP

(57) ABSTRACT

A connector assembly is provided for facilitating live connection of equipment in a switchgear. The assembly includes two circular plates, and conductive fingers which are arranged and spaced apart around the two plates to form a finger cluster with first open-end on a first cluster end and second open-end on an opposite second cluster end. Each open-end can receive a conductor therein. Each finger can include a first finger end and an opposite second finger end which form respective first and second cluster ends; two first interior grooves which are spaced-apart on an interior surface to receive a portion of respective plates; and first and second exterior grooves on an exterior surface around the first and second finger ends respectively. The assembly also includes first and second garter springs which are arranged around the fingers in respective first and second exterior grooves to apply a force against the fingers.

13 Claims, 21 Drawing Sheets

(51) Int. Cl.
  *H01R 13/53*  (2006.01)
  *H02B 1/20*   (2006.01)
  *H02B 1/56*   (2006.01)
  *H02B 13/00*  (2006.01)

(56) References Cited

U.S. PATENT DOCUMENTS

| | | | | |
|---|---|---|---|---|
| 5,423,700 | A * | 6/1995 | Takeuchi | H01R 13/18 |
| | | | | 439/821 |
| 5,482,481 | A * | 1/1996 | Takeuchi | H01R 13/18 |
| | | | | 439/821 |
| 5,601,456 | A * | 2/1997 | Takeuchi | H01R 13/18 |
| | | | | 439/821 |
| 6,086,398 | A * | 7/2000 | Ookawa | H01H 1/38 |
| | | | | 439/821 |
| 6,976,862 | B1 * | 12/2005 | Ormazabal Ocerin | |
| | | | | H01R 13/18 |
| | | | | 439/246 |
| 8,269,127 | B2 * | 9/2012 | Seo | H01H 1/38 |
| | | | | 218/123 |
| 8,641,437 | B2 * | 2/2014 | Tu | H01H 1/385 |
| | | | | 439/826 |
| 8,779,319 | B2 * | 7/2014 | Yang | H02B 11/04 |
| | | | | 218/140 |
| 9,583,295 | B2 * | 2/2017 | Retzlaff | H02B 11/04 |
| 10,141,126 | B2 * | 11/2018 | Belloni | H01H 1/38 |
| 10,522,303 | B2 * | 12/2019 | Belloni | H02B 11/04 |
| 2012/0199556 | A1 | 8/2012 | Yang et al. | |
| 2013/0327623 | A1 | 12/2013 | Kozuru et al. | |
| 2018/0278031 | A1 | 9/2018 | Valiyattil | |
| 2019/0035564 | A1 * | 1/2019 | Belloni | H01R 13/111 |
| 2022/0271517 | A1 * | 8/2022 | Hanna | H02B 11/167 |

FOREIGN PATENT DOCUMENTS

| | | | |
|---|---|---|---|
| EP | 3232456 | A1 | 10/2017 |
| JP | S59132303 | U | 9/1984 |
| JP | H07298462 | A | 11/1995 |
| JP | 2000294063 | A | 10/2000 |
| KR | 101031952 | B1 * | 4/2011 ......... H01H 33/6606 |
| WO | 2012142739 | A1 | 10/2012 |
| WO | 2016127156 | A1 | 8/2016 |

OTHER PUBLICATIONS

Partial European Search Report and Search Opinion dated May 18, 2022 for corresponding European Patent Application No. EP21217603.6, 14 pages.

Extended European Search Report and Search Opinion dated Sep. 29, 2022 for corresponding European Patent Application No. EP21217603.6, 18 Pages.

* cited by examiner

Bussing design 700

| Ampacity | bus | Quantity | Size (in) | Size (mm) |
|---|---|---|---|---|
| 1200A | riser/load | 1 | 0.3750 X 3.5 | 9.52 X 88.90 |
| | main | 1 | 0.1875 X 6.0 | 4.76 X 152.4 |
| 2000A | riser/load | 2 | 0.3750 X 3.5 | 9.52 X 88.90 |
| | main | 1 | 0.3750 X 6.0 | 9.52 X 152.4 |
| 2500A | main | 2 | 0.3750 X 6.0 | 9.52 X 152.4 |

FIG. 7 primary

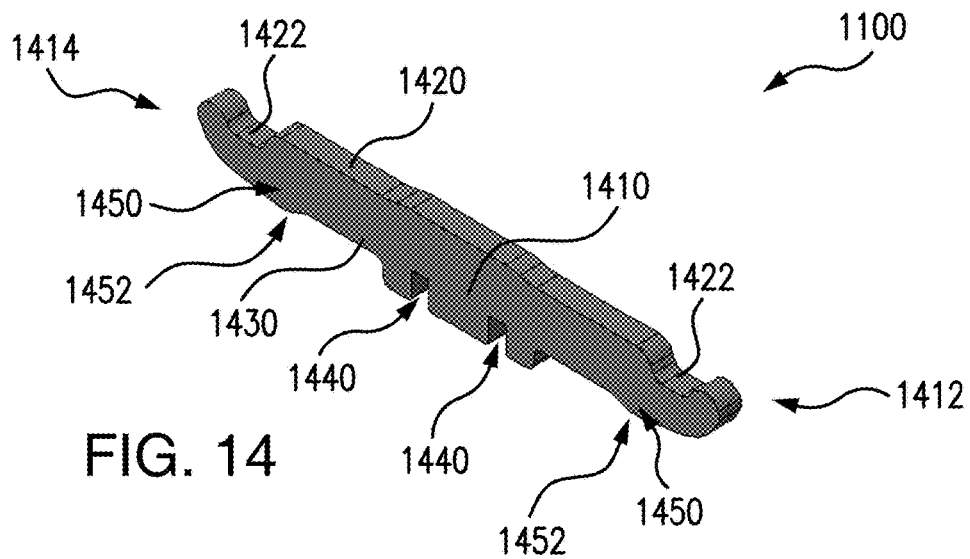
FIG. 14
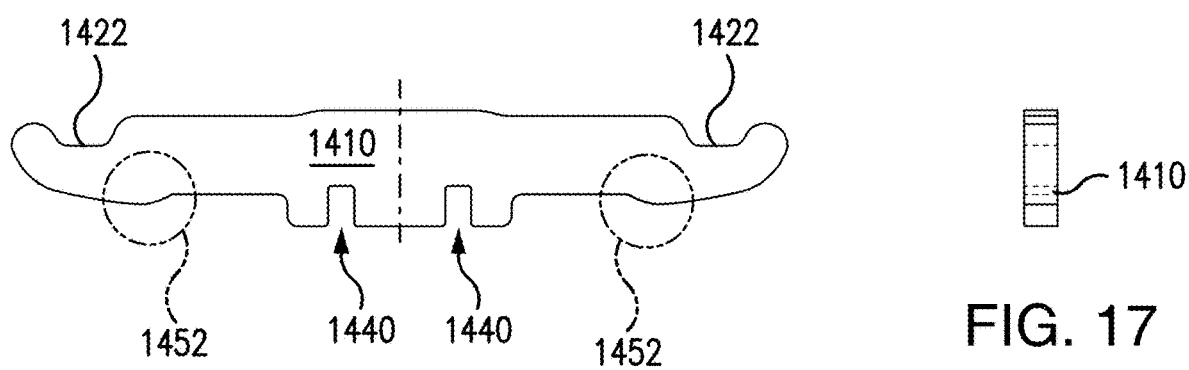
FIG. 15
FIG. 17
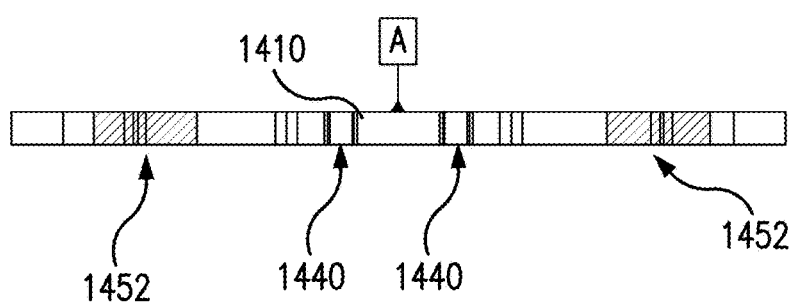
FIG. 16

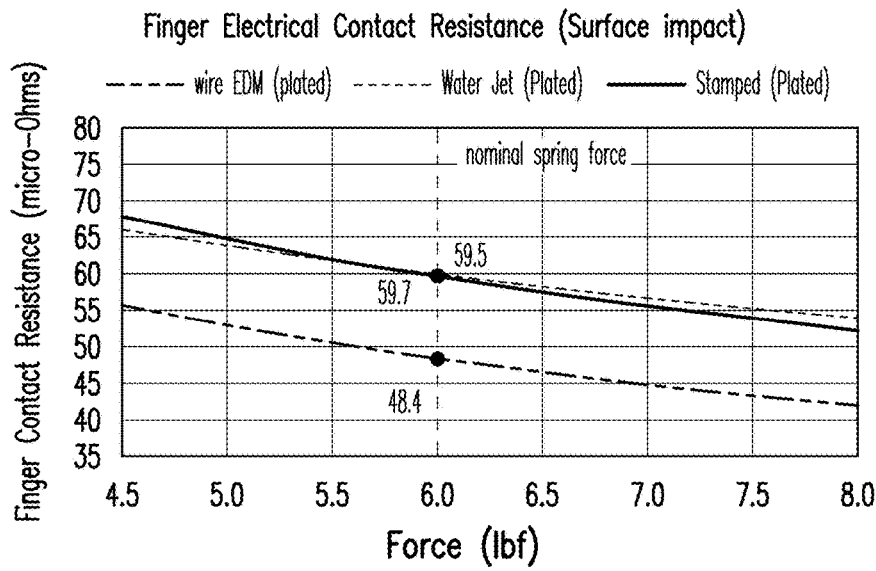
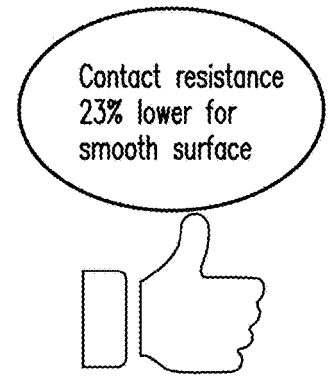
FIG. 18
| Performance | Free | Installed | During Installation | At Maximum Allowable Stress |
|---|---|---|---|---|
| Length w/o Nibs [in] | 5.7631 | 6.8917 | 7.6079 | |
| Garter ID [in] | 1.8008 | 2.1600 | 2.3880 | 2.5015 |
| Stess [psi] | | 86830 | 125011 | 144025 |
| Radial Deflection [in] | | 0.3592 | 0.5872 | 0.7008 |
| Radial Load [lbf/in] | | 6.5000 | 8.4647 | 9.3095 |
| Radial Load Tolerance [lbf/in] | | 1.8623 | 1.7465 | 1.6968 |
| Circumferential Deflection [in] | | 1.1286 | 1.8449 | 2.2016 |
| Circumferential Load [lbf] | | 7.0200 | 10.1068 | 11.6441 |
| Circumferential Load Tolerance [lbf] | | 2.0113 | 2.0854 | 2.1223 |
FIG. 19

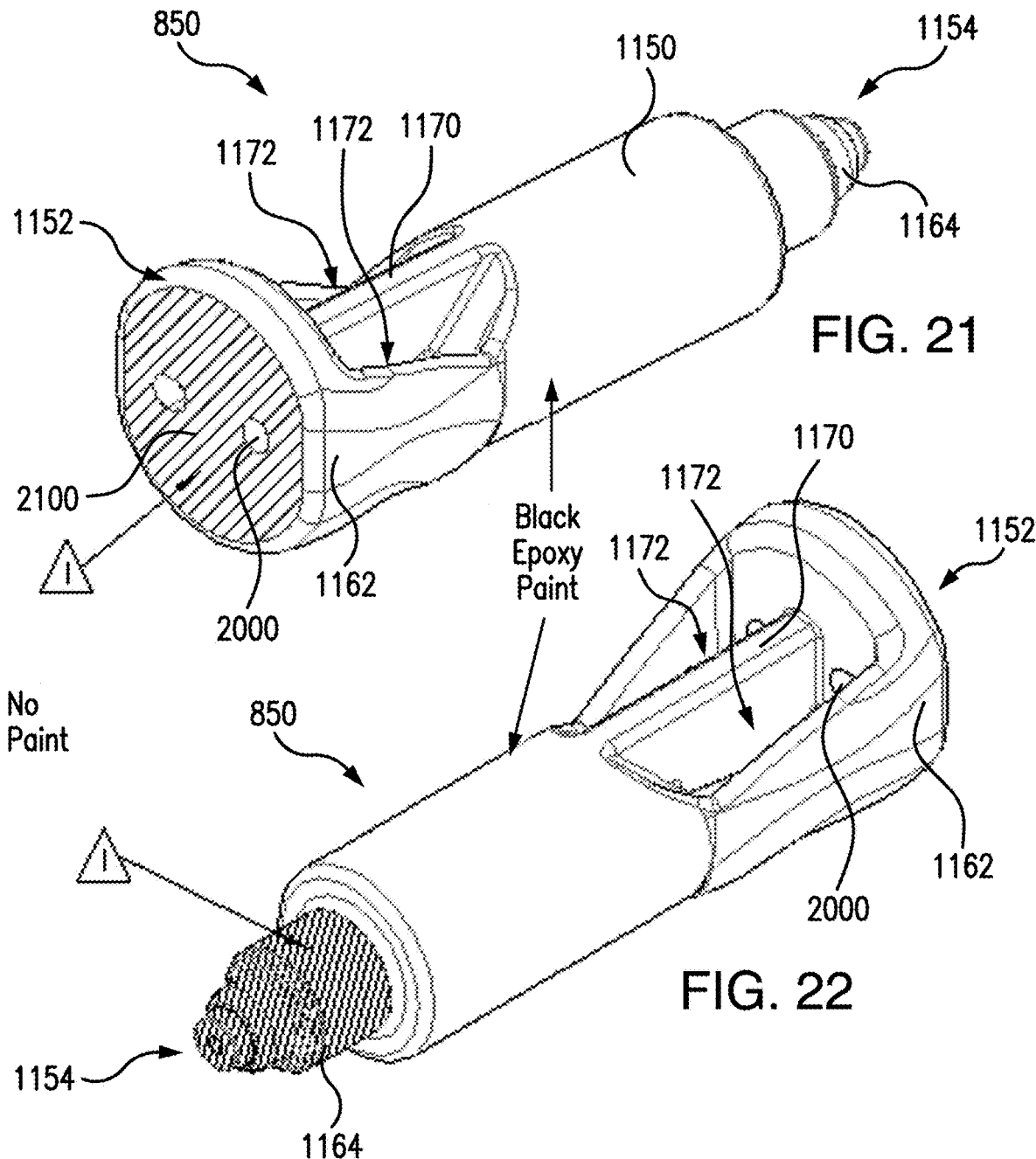

ENCLOSURE AND OPTIMIZATIONS

CROSS REFERENCE TO RELATED APPLICATIONS

This application claims the benefit of and priority to U.S. Provisional Application No. 63/131,341, filed on Dec. 29, 2020 under 35 U.S.C. 119(e), which application is incorporated by reference herein in its entirety.

TECHNICAL FIELD

The present disclosure relates to metal-clad switchgear.

BACKGROUND

A switchgear (also referred to as "switch gear assembly") is a general term, which can cover switching and interrupting devices and their combination with associated control, instruments, metering, protective and regulating devices, and assemblies of these devices with associated interconnections, accessories, and supporting structures used primarily in connection with the generation, transmission, distribution, and conversion of electric power. Switchgear enclosures (also referred to as "cabinets") are commonly employed in electrical power distribution systems for enclosing circuit breakers and other switching or protective equipment associated with the distribution system. Typically, switchgear enclosures are comprised of a number of individual stacked or adjacent compartments, and receive electrical power from a power source and distribute is the electrical power through one or more feeder circuits to one or more loads. Switchgear enclosures typically include circuit protection device for interrupting electric power in a particular feeder circuit in response to hazardous current overloads in the circuit. A circuit protection device in electrical equipment can be a circuit breaker, fuse and switch combination, contactor and fuse combination or any other device intended to break or protect the load or secondary side of a circuit.

SUMMARY

To address these and other shortcomings, in accordance with an embodiment, a connector assembly is provided for facilitating live connection of a switching or protective equipment in a switchgear assembly (also referred to as "switchgear"). The connector assembly includes at least two circular plates, which are formed of a conductive material and spaced apart from one another. The connector assembly further includes a plurality of fingers which are formed of a conductive material and are arranged and spaced apart around the at least two circular plates to form a finger cluster with a first open-end on a first cluster end and a second open-end on an opposite second cluster end. The first and second open-ends each are configured to receive a conductor therein. Each of the plurality of fingers include: a first finger end and an opposite second finger end which form respective first and second cluster ends; at least two first interior grooves which are spaced-apart on an interior surface, each of the two first interior grooves being configured to receive a portion of a respective one of the two circular plates; and first and second exterior grooves on an exterior surface, the first and second exterior grooves being positioned around the first and second finger ends respectively. The connector assembly also includes first and second garter springs which are arranged around the plurality of fingers in respective first and second exterior grooves of the plurality of fingers to apply a force against the plurality of fingers.

In various embodiment, each of the plurality of fingers can include two protruding portions which extend toward an internal cavity of the finger cluster and include a contact surface, one of the two extending protruding portions being arranged between one of the two first interior grooves and the first finger end, the other of the two protruding portions being arranged between the other one of the two first interior grooves and the second finger end. The finger cluster can be configured to make at least a three-point contact with a conductor engaged therein through the first or second open-end, via the contact surfaces of the plurality of fingers. Each finger can have a substantially smooth surface.

In some embodiments, the connector assembly can further include a runback having a first runback end and an opposite second runback end, one of the first and second runback ends being configured to engage the finger cluster through one of the first or second open-ends of the finger cluster, the other of the first and second runback ends being connected to conductor(s) leading to switching or protective circuitry of the switching or protective equipment. The runback can include a plurality of open ventilation areas at the other one of the first and second runback ends. The runback can formed by metal casting and include two open ventilation areas which extend through the runback, the two ventilation areas being symmetrical along a central longitudinal axis running from the first runback end to the second runback end. The runback can taper from the other one of the first and second runback ends with the open ventilation areas to the one of the first and second runback ends connected to the finger cluster. The finger cluster and the runback can be rated for 2,000 Amp application or for use in MV switchgear application. The plurality of fingers can include 20 fingers which are spaced apart at or around 22 mm around the circular plates. The runback can also be covered with an epoxy paint made of an insulating material, except at locations on the first and second runback ends where the runback makes a connection to the finger cluster and the conductor(s).

In accordance with an embodiment, a switchgear assembly includes an enclosure having a plurality of compartments for housing switchgear components. The plurality of compartments includes at least one compartment for housing switching or protective equipment. The enclosure includes: a plurality of vents for venting gases from an interior of the enclosure, the plurality of vents including at least one top vent at a top of the enclosure; and at least one pair of vertical walls along a first side of the at least one compartment housing a breaker or other switching or protective equipment. The pair of vertical walls have a passage therebetween for directing gases from an interior bottom area below the breaker or other switching or protective equipment to the at least one top vent of the enclosure. One of vertical walls of each pair of vertical walls is an outer wall of the at least one compartment.

In various embodiments, the passage of each pair of vertical walls can be configured to direct hot air produced by the switching or protective equipment from the bottom interior area out from the enclosure via the at least one top vent, the at least one compartment having a front wall or panel with one or more bottom vents. The pairs of vertical walls can be arranged on opposite sides of the switching or protective equipment.

In some embodiments, the switchgear assembly further includes a bus for a load-side path for one phase. The bus comprises first and second conductors in which a first and opposite second end of the first conductor is in contact with respective first and opposite second ends of the second conductor. A portion of the first and second conductors, which is between the first and second ends of the first and second bars, have the first and second conductors spaced-apart and extending diagonally in parallel with each other. The bus can be rated for 2,000 Amp application or for use in MV switchgear application.

In further embodiments, one or more of the plurality of compartments at a top of the enclosure can include inlet or outlet vents on a top outer wall (e.g., top outer wall, roof, etc.), one or more of the compartments can have a rear outer wall with inlet or outlet vents, and the enclosure can include a plurality of metal clad barriers to separate equipment housed in the enclosure. The switching assembly can also include one or more buses to electrically connect equipment housed in different locations of the enclosure, the one or more buses having a horizontal or vertical orientation or a combination thereof.

In various embodiments, the switching assembly can include a breaker ground shoe having a U-shape cross-section with two open-ends tapering toward each other, the two open-ends being configured to connect to a ground bus, and an opposite closed end from the two-open ends being configured to connect to a conductor from a circuit breaker or other switching or protective equipment. The ground bus can include an extending rail for receiving the two open-ends of the breaker ground shoe, the rail being clamped between the two open-ends when the breaker ground shoe is engaged to the ground bus.

In some embodiment, the switchgear assembly can include a gusset kit reinforcement, connected to an interior bottom corner of a compartment, for protecting against seismic activity.

In a further embodiment, the switchgear assembly can also include a primary stab bus formed of a conductive material; and an insulator sleeve for housing the primary stab bus, the insulator sleeve formed of an insulating material. One end of the primary stab bus can have a circular end with a plurality of spaced-apart fastener holes along an outer perimeter for receiving fasteners to connect the primary stab bus in the insulator sleeve, the primary stab bus tapering from the one end with the fastener opening to an opposite end for connection to switching or protective equipment.

In yet another embodiment, the switchgear assembly can include a bus which is shielded and connected to the one end of the primary stab bus; and a current transformer having an insulating enclosure with an opening therethrough for receiving the insulator sleeve which supports the current transformer. The insulator sleeve, primary stab bus, shielded bus and current transformer can be provided for each phase of a multi-phase power source, the current transformers each having a square or rectangular insulating enclosure which is stacked next to each other to form a wall between the switching or protective equipment and the shielded bus cables.

In various embodiments, the plurality of compartments can include a front compartment having a low voltage drawer for housing low voltage equipment, the low voltage drawer being slidingly engaged to the enclosure to slide between an open or closed position. The plurality of compartments can include a front compartment having a low voltage compartment with removable door panel(s), terminal blocks in a top wireway, or an auxiliary device insertable in the enclosure at an end of the low voltage compartment. The plurality of compartments can include a front compartment for housing a circuit breaker or other switching or protective equipment. The front compartment can have a width of 26 inches.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 7 illustrates a Table which includes example design specifications for main, riser/line and load buses for different current ratings, in accordance with an embodiment.

FIG. 14 illustrates an elevated perspective view of an example finger of a finger cluster, in accordance with an embodiment.

FIG. 15 illustrates a side view of a side profile of a finger of a finger cluster, in accordance with an embodiment.

FIG. 16 illustrates a bottom view of an interior surface of a finger of a finger cluster, in accordance with an embodiment.

FIG. 17 illustrates a cross-sectional view of a finger of a finger cluster along the Section A-A of FIG. 16, in accordance with an embodiment.

FIG. 18 illustrates an example Table of Finger Contact Resistance versus Force (lbf) for different manufacturing/fabrication processes, e.g., wire EDM, Water Jet, and Stamped, in accordance with an embodiment.

FIG. 19 illustrates example performance characteristics for an example garter spring for a finger cluster, where "in" refers to inch, and "lbf" refers to pounds-force, in accordance with an embodiment.

FIGS. 21 and 22 illustrate different elevated perspective views of a runback covered in part with an insulating epoxy resin/paint, in accordance with an embodiment.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure is directed to a switchgear, which can deliver higher performance in a smaller footprint. For example, a metal-clad switchgear can be designed with a 26 inch wide compartment, such as cubicle (or cubicle compartment) for Medium Voltage (MV) switchgear applications including for example current applications rated for 2,000 Amps. To meet these specifications, the switchgear can incorporate various thermal, dielectric, seismic and other improvements to the switchgear enclosure (also referred to as "cabinet") or equipment housed in the enclosure. These improvements can include among other things: improvements to conductor or bus bar designs which optimize runbacks, number and shape of fingers and other components of a finger cluster for a breaker (also referred to as "breaker cluster"), and shape of the conductors of the buses and spacing between the conductors of the buses to allow or facilitate free flow of air to improve heat dissipation and to satisfy short-circuit and other electrical requirements; more effective compartment ventilation, including breaker compartment ventilation, using double walls on one or more sides of the enclosure or compartment(s) thereof to provide air flow passage(s) for unforced air circulation as well as additional inlet and outlet vents (or vent openings/areas); finger cluster optimization (minimizing partial discharge through reduction of the triple point) for breaker connector assembly; and improvements to other aspects of the switching or protective equipment, the switchgear enclosure, buses or other components of the switchgear assembly.

Example switchgear and switchgear components are described below with reference to the figures and are also described in the Appendices A and B, in accordance with the present disclosure.

Figure 1:
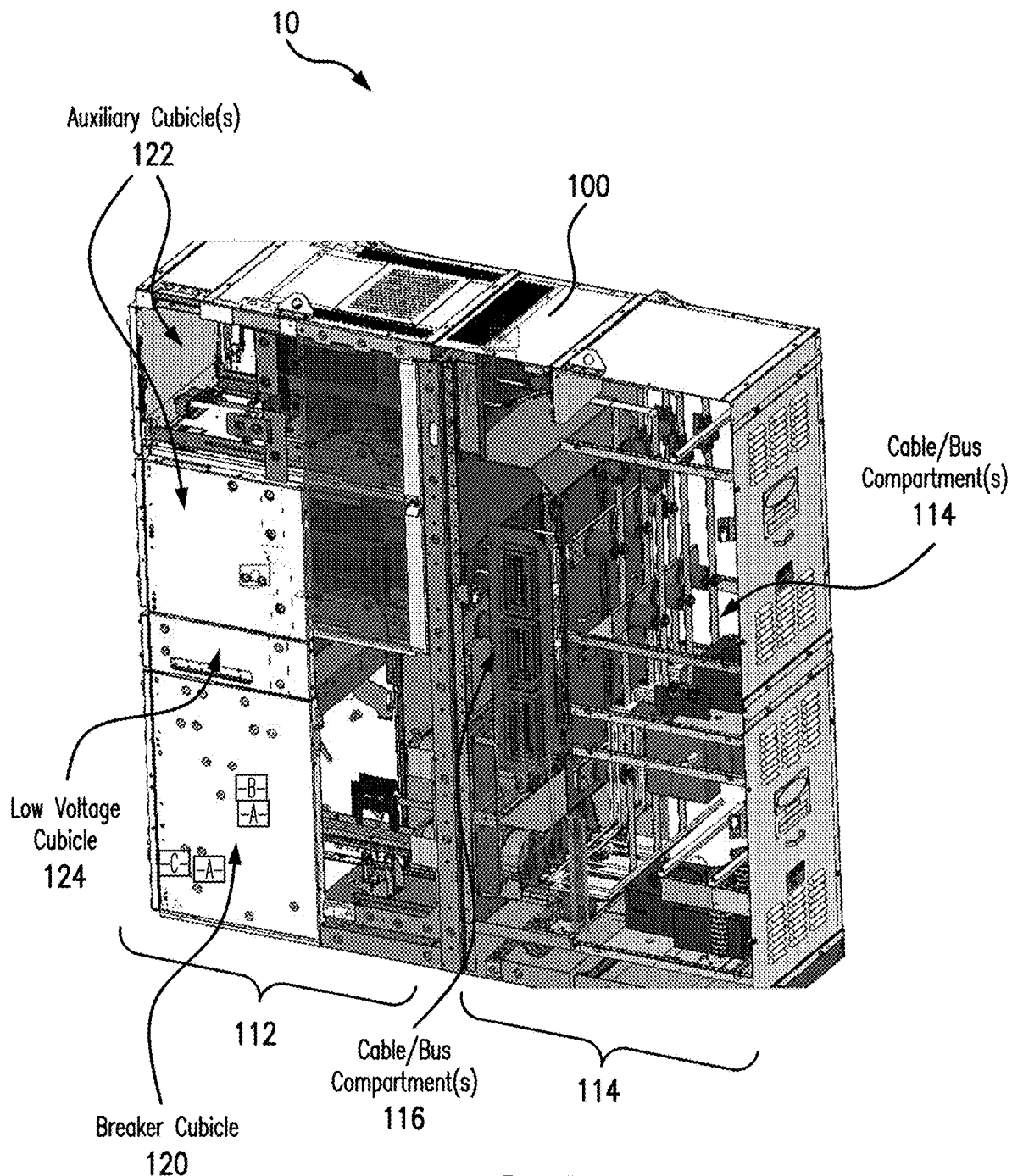
FIG. 1 illustrates an elevated back and side perspective view of a switchgear assembly with an enclosure having panels or walls (used interchangeably herein) of some of the compartments removed to show various switchgear components housed in the enclosure (also referred to as "cabinet"), in accordance with an embodiment.
Figure 2:
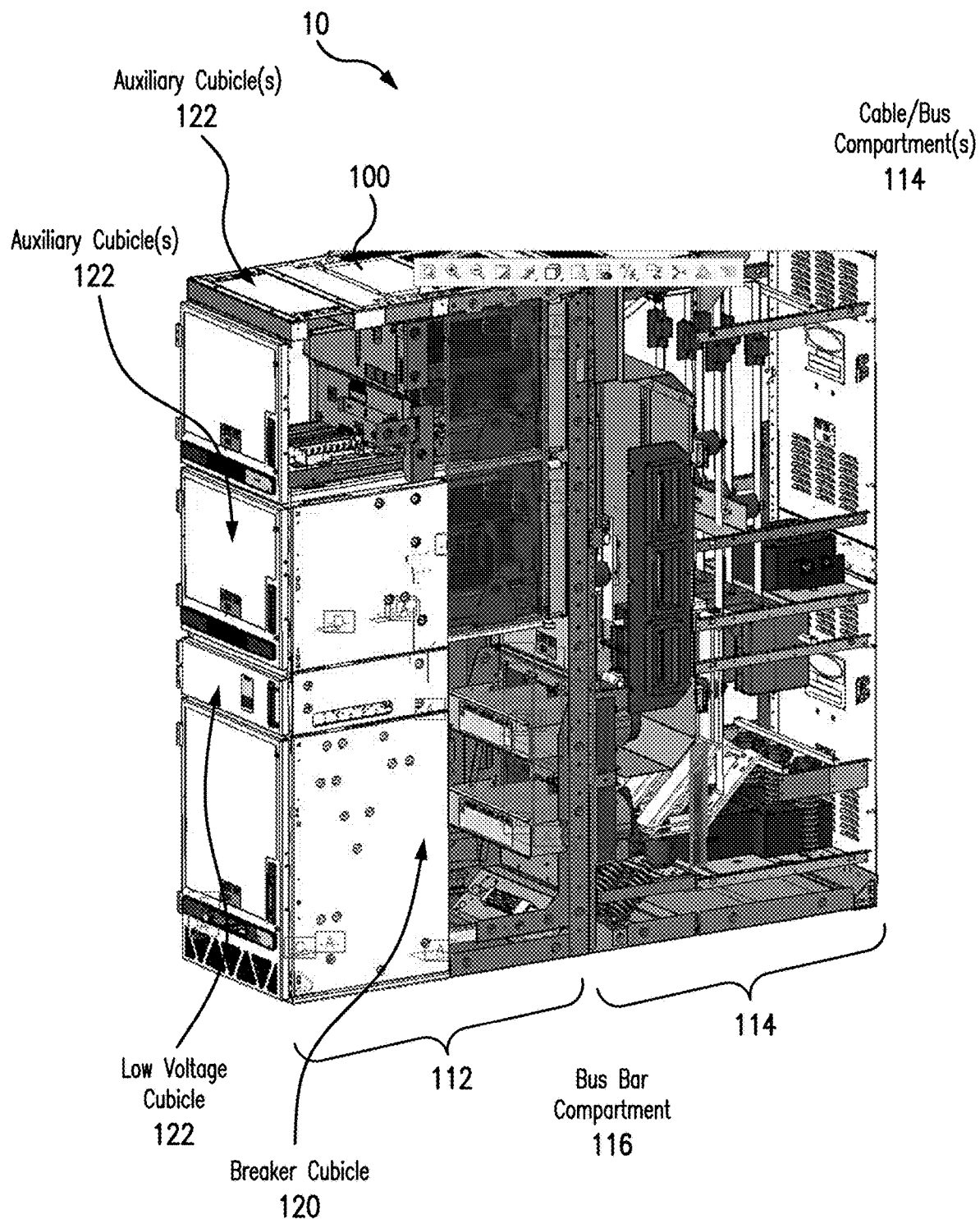
FIG. 2 illustrates an elevated front and side perspective view of a switchgear assembly with an enclosure having panels of some of the compartments removed to show various switchgear components housed in the enclosure, in accordance with an embodiment.

FIG. 1 shows a partial view of an example switchgear assembly 10, which includes a switchgear enclosure 100 for housing switching and protective equipment and auxiliary equipment, electrical buses/cabling, bus bars and other components of the switchgear assembly. In this example, the switchgear assembly 10 is for a multi-phase power distribution system, such as a three-phase power distribution system. The switchgear enclosure 100 can include a plurality of compartments for housing switching, protective and/or auxiliary equipment, electrical buses/cables, bus bars for line and load, and other components. The compartments can, for example, include: a switching and/or auxiliary compartment(s) 112 for housing switching, protective and/or auxiliary electrical equipment such as circuit breakers, transformers and other protective equipment or devices; a bus bar compartment(s) 16 for housing line and load bus bars which can be connected to a power source and various loads, respectively; and a cable compartment(s) 114 for housing buses or cables (generally referred to as buses) and their conductors which electrically connect various equipment, bus bars and other components in the switchgear enclosure 100. The compartments can include cubicles or other types of compartments, which can be vertically and/or horizontally stacked against or next to each other. The switchgear assembly 10 can be a metal-clad switchgear with metal-clad barriers arranged between different compartment(s), equipment, bus assemblies and other components of a switchgear.

In this example, the compartment(s) 112 can include sub-compartments, such as breaker cubicle 120, auxiliary cubicles 122 and low voltage cubicle 124, which are vertically stacked. The breaker cubicle 120 can house a circuit breaker, such as a draw-out breaker which can be racked-in and racked-out from the cubicle 120. The auxiliary cubicles 122 can house auxiliary equipment, such as a control power (CP) transformer, a voltage transformer, fuses or other auxiliary equipment. The low voltage cubicle 124 can include a drawer for housing low voltage equipment. The enclosure 100 can include a ventilation system for venting gases from the enclosure 100 and controlling airflow in, through, and out from the enclosure 100 to cool equipment in the switchgear assembly 10. The ventilation system can include inlet and outlet vents (or ventilation openings) on a top and other sides (e.g., right, left, front and back) of outer walls or panels of the compartments of the enclosure 100 as well as on equipment/devices, and can also include gas flow (or air) passages, formed from interior/exterior walls of the enclosure, for directing the flow of gases in and out from the enclosure 100.

Figure 3:
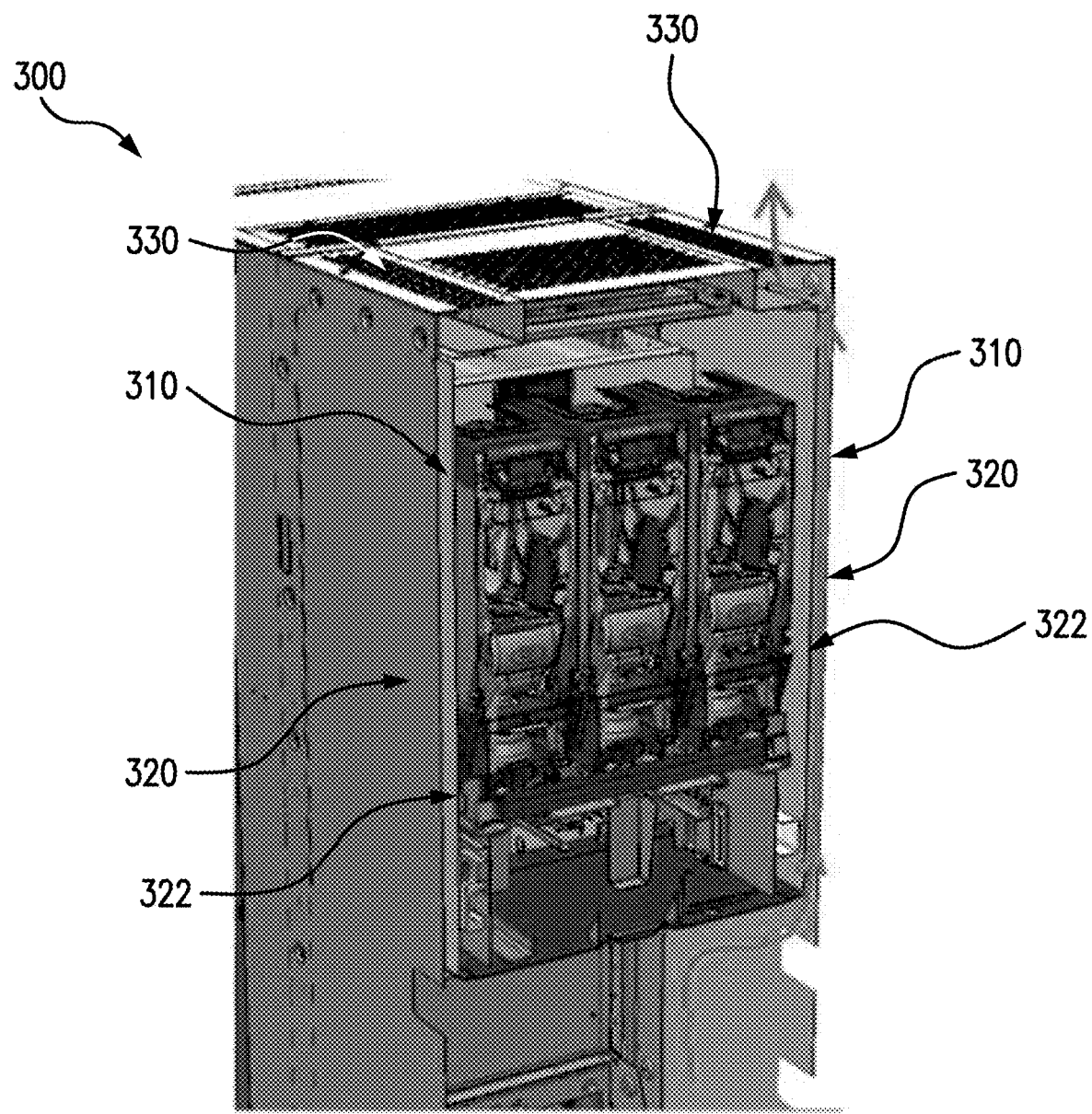
FIG. 3 illustrates a perspective view of a compartment of a switchgear enclosure, in accordance with an embodiment.
Figure 4:
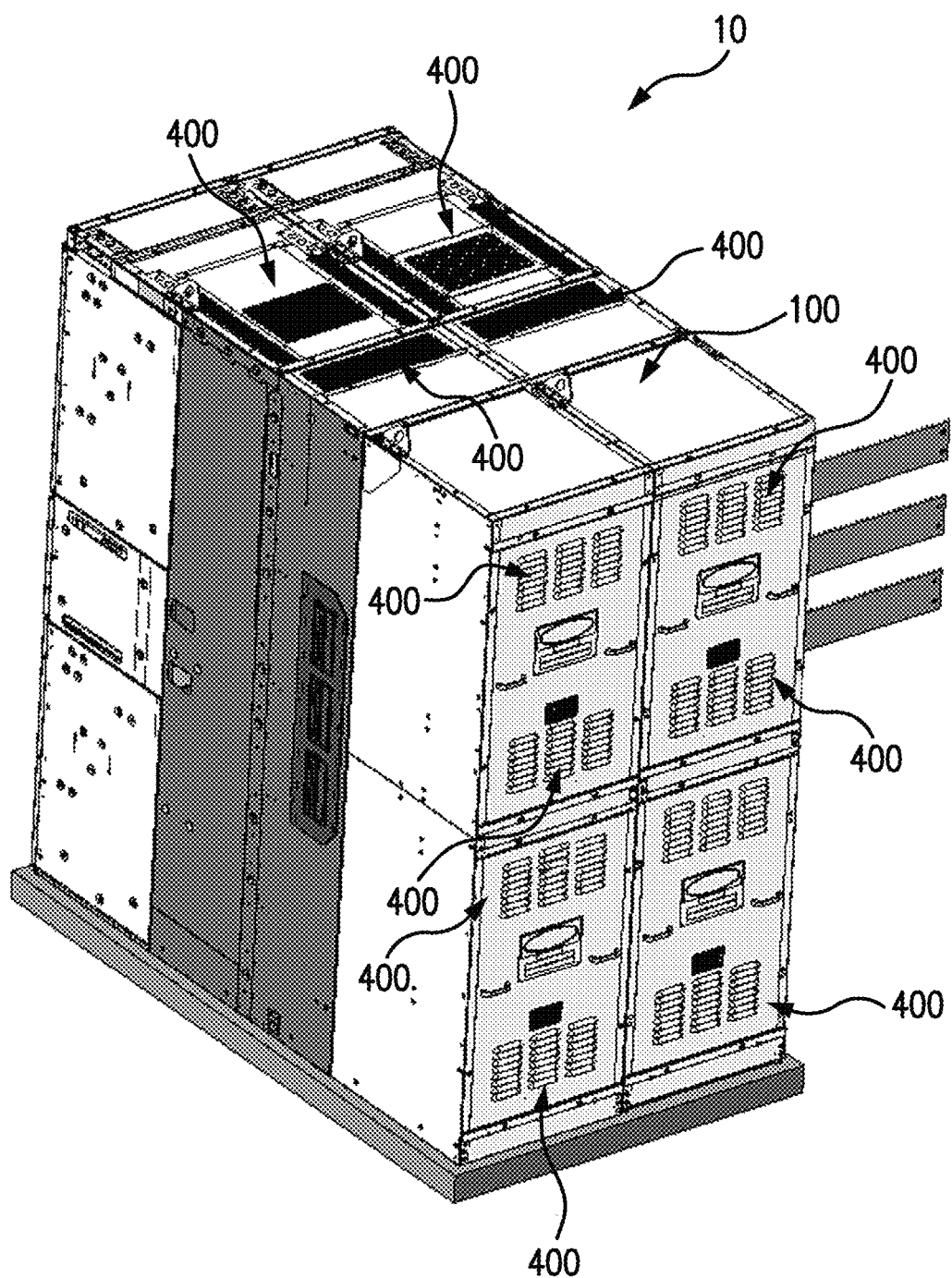
FIG. 4 illustrates a switchgear assembly with a plurality of vents or ventilation openings arranged on various panels of the switchgear enclosure, in accordance with an embodiment.

For example, as shown in FIG. 3, a compartment such as a cubicle 300 can have gas flow passage 310 formed between an outer or external wall 320 and internal wall 322 of the cubicle 300. In this example, Each opposing side of the cubicle 300 can include a passage 310 which can direct the flow of gases (including air) from a bottom region of the cubicle 300 below the housed equipment (e.g., a circuit breaker or other switching or protective equipment) to vents 330 on a top (or roof) of the cubicle 300. The vents 330 can extend along a side of the top or roof of the cubicle 300. The cubicle 300 can have a suitable size and dimension according to the equipment to be housed. In some embodiments, a plurality of cubicles 300 can be vertically stacked to form a continuous air passage 310 along opposing sides of the stacked cubicles to direct gases toward top vents for venting gases from the switchgear enclosure or compartment(s) thereof and/or air used to cool switchgear equipment. Examples of other additional inlet or outlet vents 400 of the enclosure 100 are shown in FIG. 4. The vents 400 can have various sizes and shapes and can be arranged at various locations (e.g., any side of the enclosure 100 or compartments thereof including top, right, left, front and back) to facilitate airflow into and out from the enclosure 100 to cool equipment housed therein, and to vent out other gases which may buildup during operation of the switchgear 10. As shown in FIG. 4, vents 400 can be incorporated on top and back sides of enclosure 100 or compartments thereof of the switchgear 10. The various features of the venting system described herein can be used to construct a smaller or more compact switchgear assembly (e.g., MV switchgear) while still satisfying thermal and other switchgear requirements.

Figure 5:
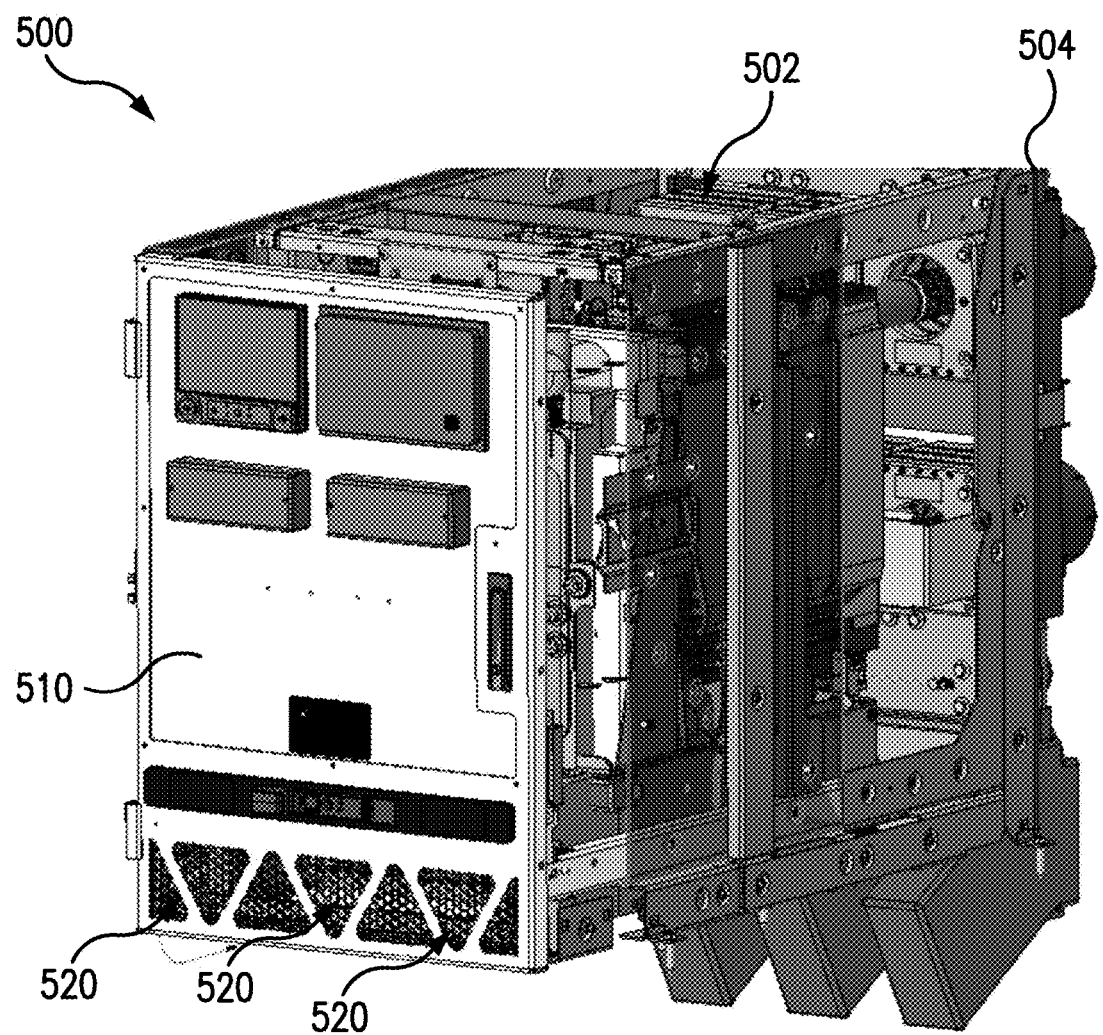
FIG. 5 illustrates an example circuit breaker assembly for a switchgear assembly, in accordance with an embodiment.

FIG. 5 shows a portion of an example circuit breaker assembly 500, which is arranged in a switchgear enclosure (e.g., 100) of a switchgear assembly. In this example, the circuit breaker assembly 500 includes a draw-out circuit breaker 502 which can be racked into and out of a breaker cradle in a compartment (e.g., a breaker cubicle) of the switchgear enclosure to engage or disengage, respectively, from a plurality of line and load stab buses on a backplane 504. The circuit breaker 502 can have vents or ventilation openings on a bottom to vent gases. The circuit breaker assembly 500 can also include a front panel 510 having vents 520 along a bottom region (below or under the circuit breaker 502) to facilitate the flow of gases in or out from the enclosure.

Figure 6:
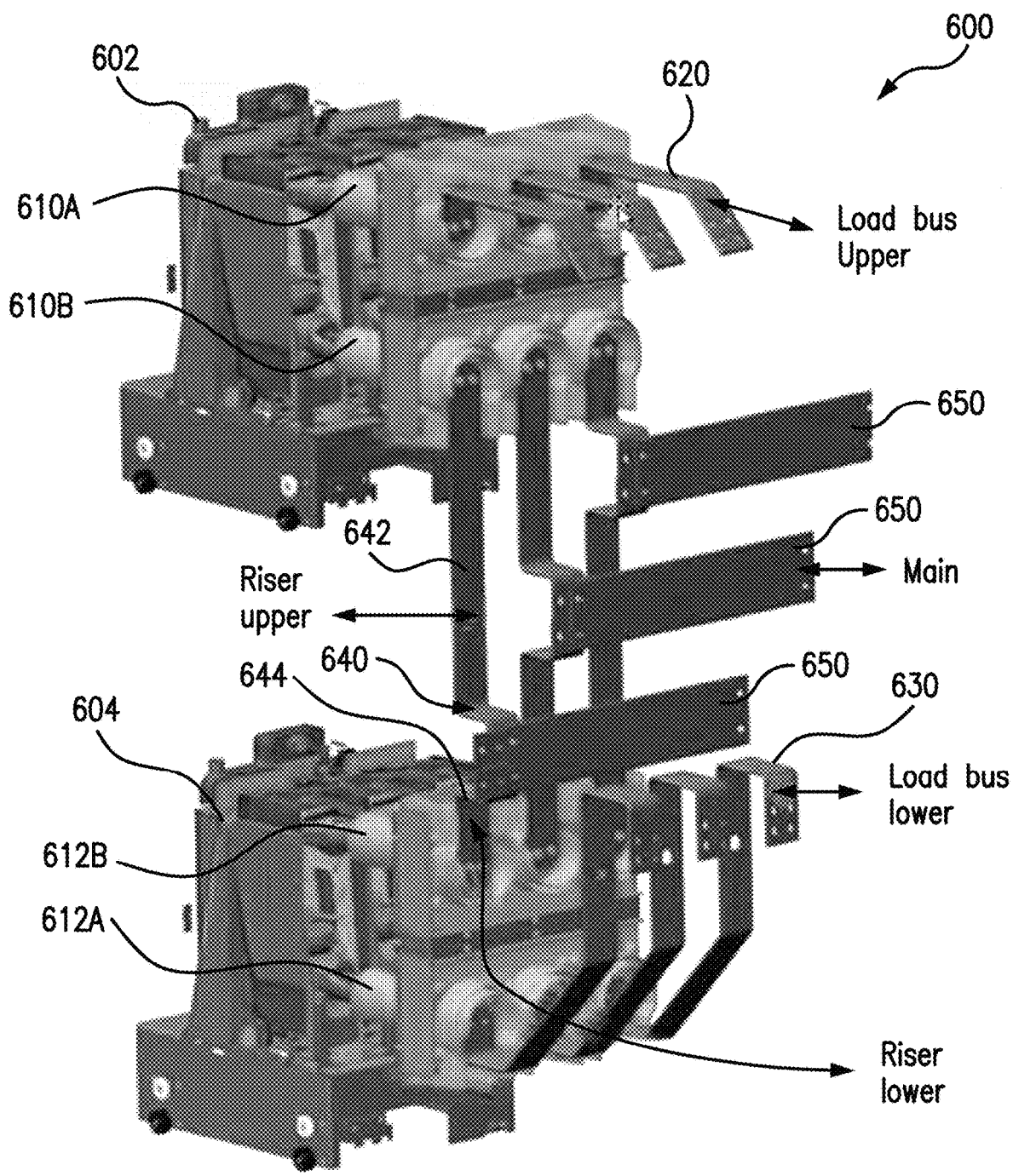
FIG. 6 illustrates an example bus assembly for connecting load and line buses to equipment housed in an enclosure of a switchgear assembly, in accordance with an embodiment.

FIG. 6 shows an example bus assembly 600 for connecting load and line buses to equipment housed in an enclosure (e.g., 100) of a switchgear, in accordance with an embodiment. In this example, the equipment can include an upper device 602 and a lower device 604, such as circuit breakers, which are housed in sub-compartments of a switchgear assembly for a three-phase power supply system. For each phase, the bus assembly 600 can include an upper load stab bus and upper line stab bus which are each housed in respective upper insulator sleeves 610A and 610B, and lower load stab bus and lower line stab bus which are each housed in respective lower insulator sleeves 612A and 612B. The bus assembly 600 further includes a corresponding upper load bus 620 connected to one end of the upper load stab bus housed in the upper insulator sleeve 610A, and a corresponding lower load bus 630 connected to one end of the lower load stab bus housed in a corresponding lower insulator sleeve 612A. For each phase, a line bus 640 is also connected to a main bus bar 650 (also referred to as "main"), and includes an upper riser 642 and a lower riser 644 connected respectively to an end of the upper line stab bus housed in a corresponding upper insulator sleeve 610B and an end of the lower line stab bus housed in a corresponding lower insulator sleeve 612B. Each device 602, 604 has a plurality of connector assemblies (e.g., assembly of runback and cluster) for engaging corresponding load and line stab buses of the bus assembly 600, which will be described in further detail below with reference to FIG. 8.

The conductors of the line and load buses and the main bus bar, such as shown in the example of FIG. 6, can be formed of a conductive material with a size and shape that can be suitable for desired current/amp ratings (e.g., 1200 A, 2000 A, 2500 A, etc.) such as shown on the Table 700 of FIG. 7. In the example of FIG. 6, the conductors of the buses are flat conductors. In this way, the conductors of the line and load buses and the main bus bar can be designed/configured with a reduced footprint in the enclosure of the switchgear to perform at desired current applications, such as for medium voltage switchgear and equipment used therein. For example, it is possible to reduce the overall size (e.g., length and width) and amount of materials for the conductors of the buses in the switchgear, and thus, the footprint/size of the switchgear for MV switchgear applications.

Figure 8:
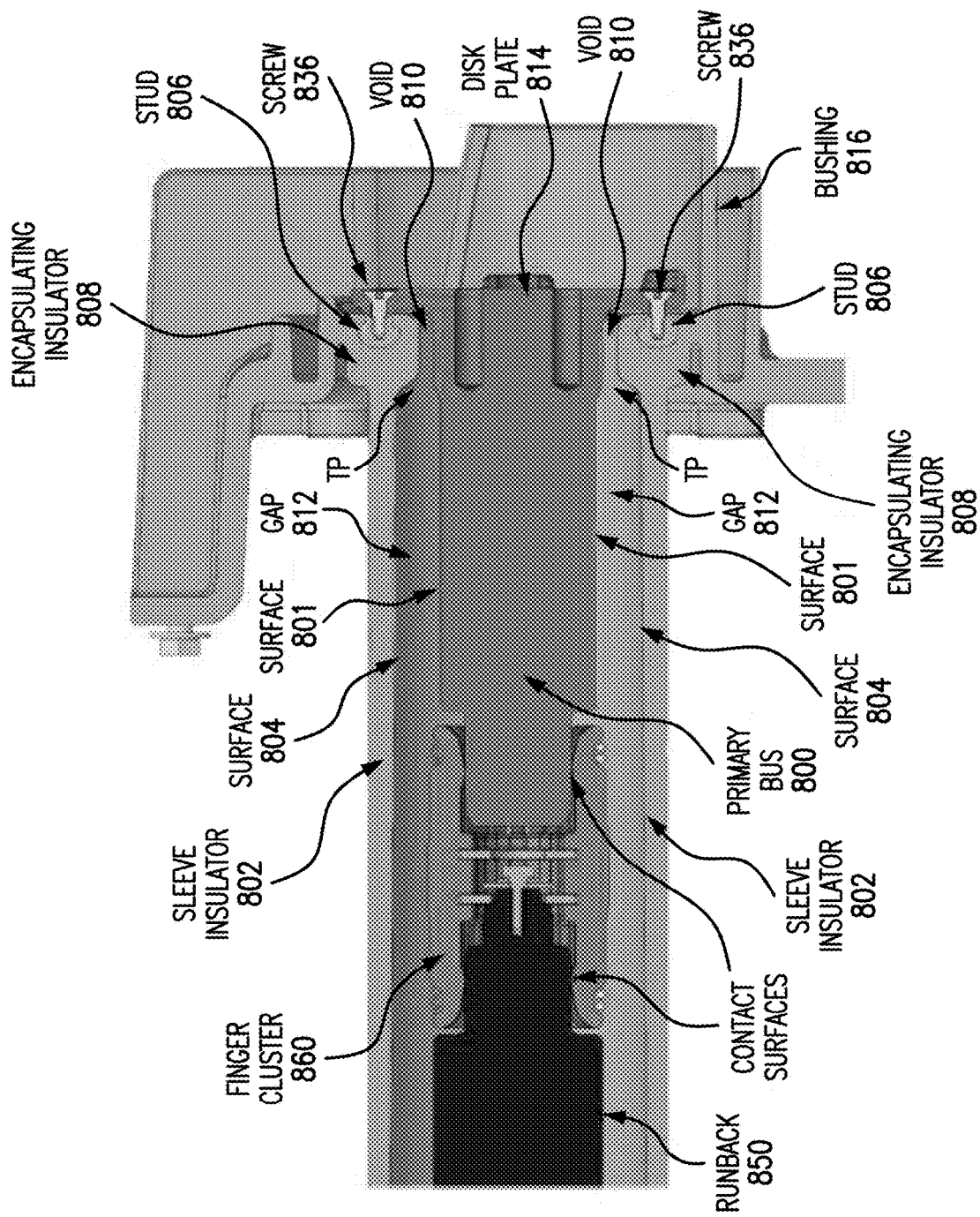
FIG. 8 illustrates a cross-sectional side view of an insulator sleeve, and a connector assembly for a circuit breaker or other switching or protective equipment, in accordance with an embodiment.

FIG. 8 is a side, cross-sectional view of a cylindrical, current carrying conductor or primary stab bus 800 for a medium voltage circuit breaker, illustrating an embodiment for reducing partial discharge (PD) in an insulator sleeve 802 surrounding the conductor 800 with an air gap 812 between the conductor 800 and the sleeve insulator 802. A medium voltage circuit breaker may have a rated maximum voltage of, for example, from 5 to 15 kV, a rated continuous current of, for example, from 1200 to 2000 Amperes, and a rated power frequency of, for example, 60 Hz. A finger cluster 860 is shown connecting the conductor or primary stab bus 800 to a runback conductor 850 (also referred to as a "runback") that connects to the main contacts of the circuit breaker (not shown). The finger cluster 860 includes protruding portions which extend into an interior cavity of the finger cluster and include contact surfaces for making contact with a portion of the conductors 800 and 850 engaged in the finger cluster 860. In this example, the finger cluster 860 has a generally cylindrical shape. The finger cluster 860 and its components will be described in further detail below.

A circular disk plate 814 is connected to either a riser/line bus providing power to the circuit breaker or to a load bus distributing power from the circuit breaker. The circular disk is covered on an outward-facing surface by an insulating bushing 816. The circular disk plate 814 has an inward-facing surface mounted coaxially on one end of the cylindrical conductor 800. The disk plate 814 includes a plurality of studs 806 mounted on an inward facing surface of the disk plate 814 and positioned along a circle coaxial with the conductor 800. The studs 806 face in an inward axial direction from the inward-facing surface of the disk plate 814. The studs 806 are mounted at a radial separation distance from an outer cylindrical surface 801 of the conductor 800. A screw 836 fastens the stud 806 to the disk plate 814. The shape of the conductor 800 can be controlled at the mounting/fastening location on the bushing 816 of the insulator sleeve 802 to address ageing/partial discharge (PD).

The insulator sleeve 802 surrounding the conductor 800 has a circular annular cross section with a radially inward-facing surface 804 and an end surface abutted to the inward-facing surface of the disk plate 814. The end surface of the insulator sleeve 802 is molded around the head of each stud 806 as an encapsulating insulator 808, for the plurality of studs 806 mounted on the disk plate 814. The rated insulation voltage withstand for insulation in a medium voltage circuit breaker may be, for example, from 19 to 36 kV. Example compositions of the insulator sleeve 802 may be, for example, glass reinforced polyester or cycloaliphatic epoxy resin. The dielectric constant of glass reinforced polyester at 60 Hz is approximately 4.30. The dielectric constant of cycloaliphatic epoxy resin at 60 Hz is approximately 3.0. By comparison, the dielectric constant of a void, such as an air pocket, is approximately 1.0.

The studs 806 on the circular disk plate 814 position the radially inward-facing surface 804 of the encapsulating layer 808 to be separated by at least 4 millimeters distance from the outer cylindrical surface 801 of the conductor 800, to increase a radial thickness of void area 810 forming a triple point region TP between the conductor surface 801 and encapsulating insulator 808, to thereby reduce occurrence of partial discharges (PD) in the encapsulating layer 808 of the insulator sleeve 802.

The size, shape and properties of the insulator sleeve 802 and its components (e.g., length, up/down walls, wall thickness, supporting during short circuit (SC), etc.) can be configured to provide for sufficient dielectric strength, such as for use in MV switchgear application.

Figure 9:
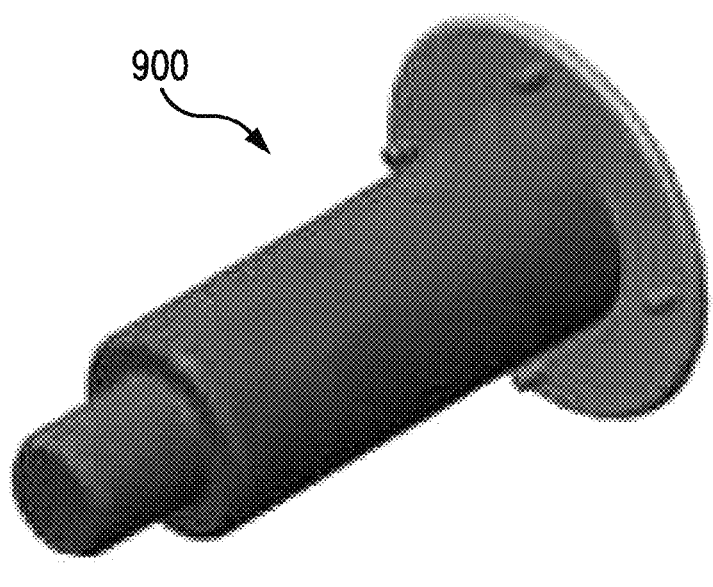
FIG. 9 illustrates an example of a primary stab bus, in accordance with an embodiment.

FIG. 9 shows an example of a primary stab bus or conductor 900, in accordance with a further embodiment.

Figure 10:
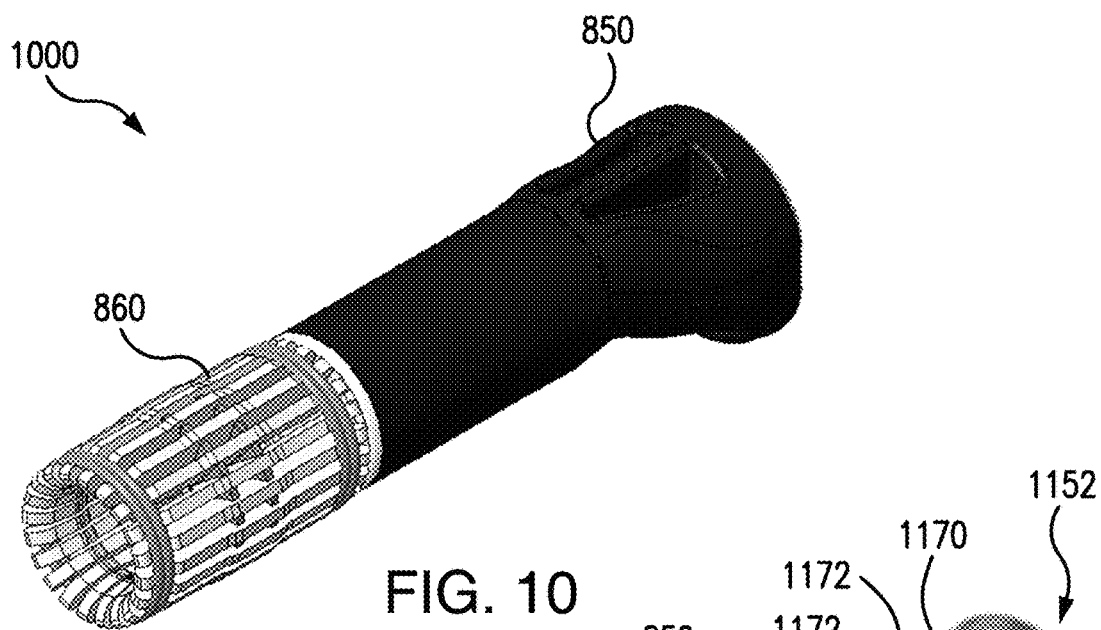
FIG. 10 illustrates an example of a connector assembly, with a runback connected to a finger cluster, for a circuit breaker or other switching or protective equipment, in accordance with an embodiment.
Figure 11:
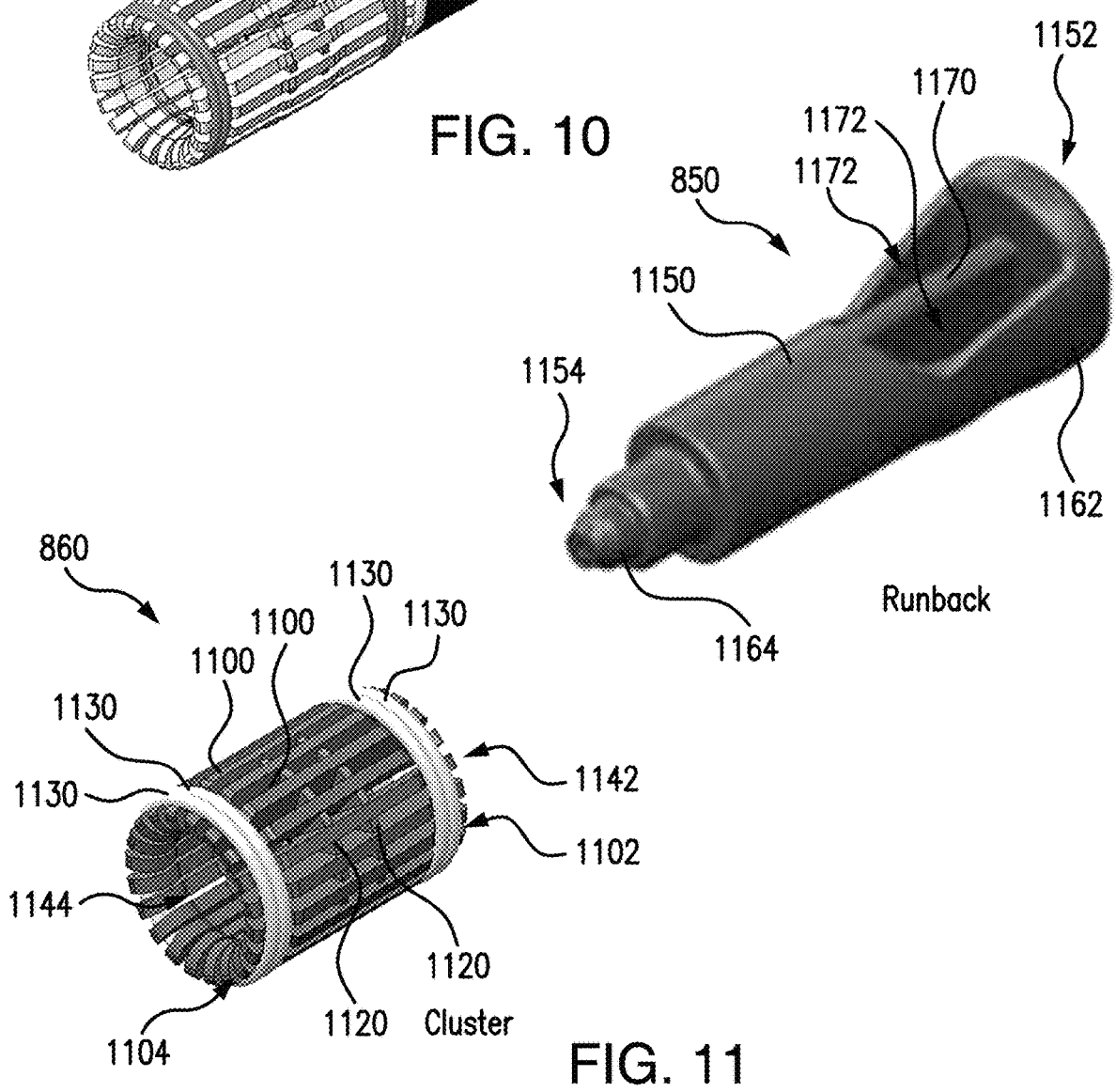
FIG. 11 illustrates an example of a connector assembly, with a runback disconnected from a finger cluster, for a circuit breaker or other switching or protective equipment, in accordance with an embodiment.

FIG. 10 shows an example of a connector assembly 1000 for a circuit breaker or other switching or protective device, in accordance with an embodiment. As shown in FIG. 10, the connector assembly 1000 can include a runback 850 connected to a finger cluster 860 (see, e.g., in FIG. 8). Any exposed area on the runback 850 can be covered in an insulating epoxy resin/paint. An exploded view of the connector assembly 1000 with the runback 850 and finger cluster 860 disconnected from each other is shown in FIG. 11. As shown in FIG. 11, the runback 850 can include a runback body 1150, with a first end 1152 and a second end 1154 which is opposite the first end 1152. The runback body 1150 includes a base 1162 at the first end 1152 and a tip 1164 at the second end 1154, and generally tapers from the first end 1152 to the second end 1154. The runback body 1150 also includes a ventilation area(s) around the first end 1152. The ventilation area(s) is formed by a wall 1170, which divides an opening into two openings or ventilation areas 1172 that extend through the body 1150. In this example, the two openings or ventilation areas 1172 are symmetrical along a horizontal or longitudinal axis of the body 1150 defined by the wall 1170. The ventilation area(s) facilitate the cooling of the runback 860 during operation thereof (e.g., live connection).

As further shown in FIG. 11, the finger cluster 860 can include a plurality of conductive fingers 1100, interior circular plates 1120 (e.g., disk plates) for supporting the fingers 1100, and garter springs 1130. The plurality of conductive fingers 1100 are spaced-apart from each other and arranged around a circumference of the interior circular plates 1120 (each of which can have a central opening therethrough) to form openings or open-ends 1142 and 1144 on opposing ends 1102 and 1104 respectively of the finger cluster 860. The garter springs 1130 are provided or wrapped around each end 1102, 1104 of the finger cluster 860 and provide a force (e.g., spring or elastic force) for clamping the fingers 1100 of the finger cluster 860 around a portion of conductors arranged therein, such as, for example, the bus stab (e.g., 800 or 900) and the runback 850 as shown in the example of FIG. 8, via openings 1142 and 1144. In this example of FIG. 11, the finger cluster 860 can include 20 spaced-apart conductive fingers, two spaced-apart circular plates 1120, and a pair of garter springs 1130 around each end 1102, 1104 of the finger cluster 860. It should be understood that any number of garter springs 1130 can be used on either ends 1102, 1104 depending on the desired elastic or spring force to be applied.

Figure 12:
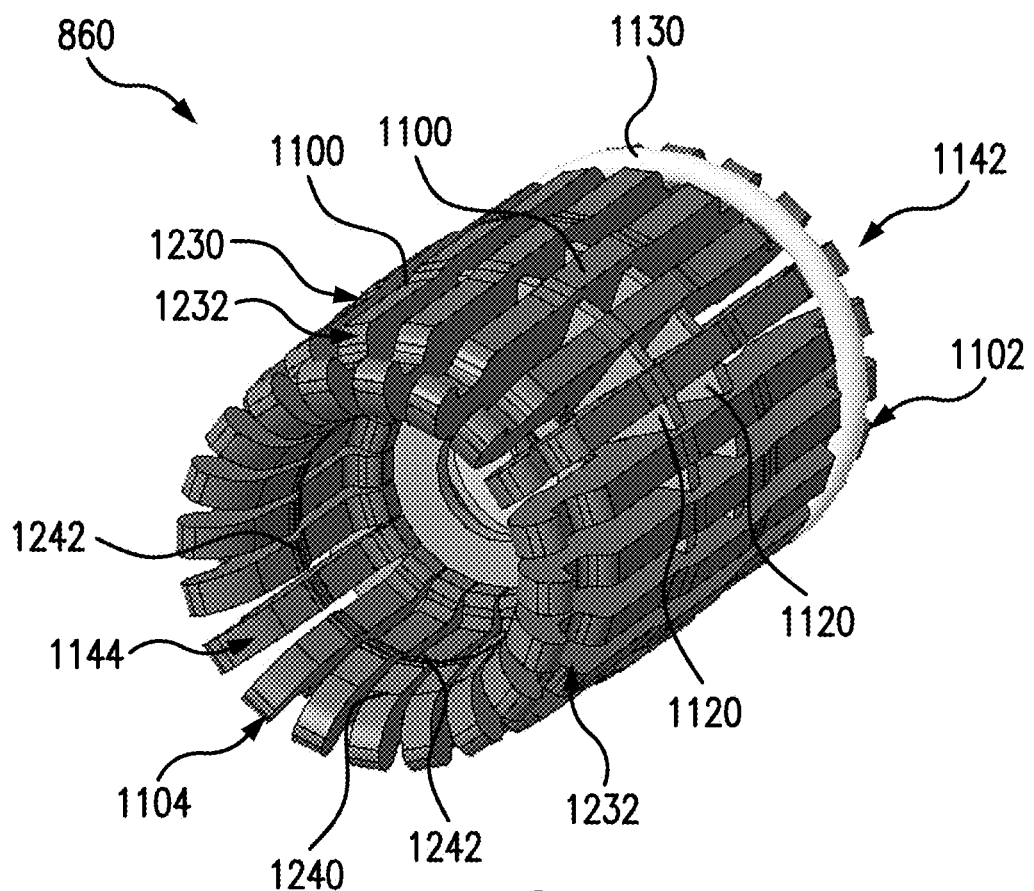
FIG. 12 illustrates an example of a finger cluster with garter spring(s) omitted on one end, in accordance with an embodiment.

FIG. 12 shows another perspective view of the finger cluster 860, with the garter spring(s) 1130 removed on one of the ends 1102 to show a channel 1232 which runs along and around an exterior (also referred to "external") surface 1230 of the finger cluster 860. The finger cluster 860 can include at least one channel 1232 on each end 1102, 1104 of the finger cluster 860. Each channel 1232 can be configured with a size, shape and/or dimension to receive and retain one or more garter spring(s) 1230.

As further shown in FIG. 12, the finger cluster 860 can include an interior (also referred to as "internal") surface 1240 with a contact surface 1242. The contact surface 1242 can be a surface(s) on a protruding portion which runs along at spaced-apart intervals around the interior surface 1240 of the finger cluster 860, and is configured to make contact with a portion of a conductor arranged in the cluster 860 via the opening 1144. The finger cluster 860 can include contact surface 1242 inside a cavity of each end 1102, 1104 of the cluster. The contact surface 1242, along with the force applied by the garter spring(s) 1130, can provide for at least three point contact with a conductor (e.g., bus stab, runback, etc.) received in an interior cavity of the finger cluster 860 via an opening or open-end 1142 or 1144. The contact surface 1242 can be configured with a size, shape and/or dimension to provide suitable surface area to make contact with a conductor received in the finger cluster 860.

Figure 13:
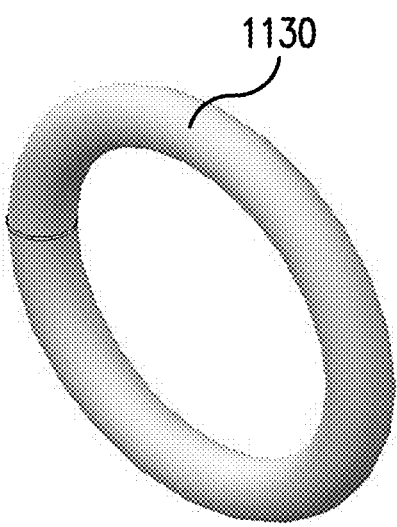
FIG. 13 illustrates an example of a garter spring, in accordance with an embodiment.

FIG. 13 shows an example of a garter spring 1130 in accordance with an embodiment. In this example, the garter spring 1130 is a circular band, which is made of an elastic insulating material. The garter spring 1130 provides flexibility to allow the openings or open-ends 1142 or 1144 of the finger cluster 860 to expand when inserting a conductor (or a portion thereof) therein, but also provides a force for clamping the fingers 1100 of the finger cluster 860 around a portion of the conductor arranged therein.

An example of the design of the conductive fingers 1100 of the finger cluster 860 is described below with reference to FIGS. 14-18. FIG. 14 shows an elevated perspective view of an example finger 1100. The finger 1100 includes an elongated body 1410 with a first finger end 1412 and a second finger end 1414 which is opposite the first finger end 1412. A tip of the first and second finger ends 1412 and 1414 can be rounded. The finger body 1410 includes an exterior surface 1420 which forms the exterior surface 1230 of the finger cluster 860, and an interior surface 1430 which is opposite the exterior surface 1420 and forms the interior surface 1240 of the finger cluster 860. The exterior surface 1420 includes a first groove 1422, on each end 1412, 1414 of the finger body 1410 of the finger 1100. The two first grooves 1422 form part of two respective channels 1232 for receiving and retaining one or more garter spring(s) 1130 on the finger cluster 860 (see, e.g., FIG. 12).

The interior surface 1420 includes two second grooves 1440 which are spaced apart from each other and arranged around a middle region of the finger body 1410 between the two finger ends 1412 and 1414. Each second groove 1440 is configured to receive a portion of a corresponding circular plate 1120 (see, e.g., FIG. 12).

The finger body 1410 further includes a protruding portion 1450 around each finger end 1442 and 1444 (e.g., between the tip of the finger end 1412 and a second groove 1440, and between the tip of the finger end 1414 and a second groove 1440). Each protruding portion 1450 extends towards the internal cavity of the finger cluster 860, and includes a contact surface 1452 (on the interior surface 1430) for making contact with a conductor, e.g., stab bus, runback, etc., when arranged in the cavity of the finger cluster 860 (see, e.g., example in FIG. 8). The contact surface 1452 of each finger 1100 form part of the contact surface 1242 (see, e.g., FIG. 12) of the finger cluster 860. The finger body 1410 of the finger 1100 is designed with a height and width (or thickness) to facilitate current flow at desired current rating between the contact surfaces 1450 on corresponding ends 1412 and 1414 of the finger 1100, such as a sufficient current rating for use with a MV switchgear and its equipment.

FIG. 15 shows a side view of a side profile of the finger 1100 with the grooves 1422 on the external surface 1420, and the grooves 1440 and contact surfaces 1452 on the internal surface 1430. FIG. 16 shows a bottom view of the interior surface of the finger 1100 with the slots 1440 for the circular plates 1120 and the contact surfaces 1452. FIG. 17 shows a cross-section view of the finger 1100 along the Section A-A of FIG. 16, and a thickness of the finger body 1410. Each finger 1100 can have a T-shape from a side view.

In various embodiments, each finger 1100 can be formed from a conductive metal as a unitary or single piece, using various metal fabrication processes or techniques including but not limited to wire EDM (Electrical Discharge Machining), stamping, molding or other manufacturing process, and can have a smooth surface, particularly where the finger 1100 makes contact with a conductor (e.g., contact surface 1242). Various techniques including polishing can be utilized to smooth or further smooth a metal surface of the finger 1100. The smooth surface of the finger 1100 can reduce the contact resistance significantly when engaged with a conductor (e.g., bus stab, runback, etc.). FIG. 18 shows an example Table of Finger Contact Resistance versus Force (lbf) for different manufacturing/fabrication processes, e.g., wire EDM, Water Jet, and Stamped.

Figure 20:
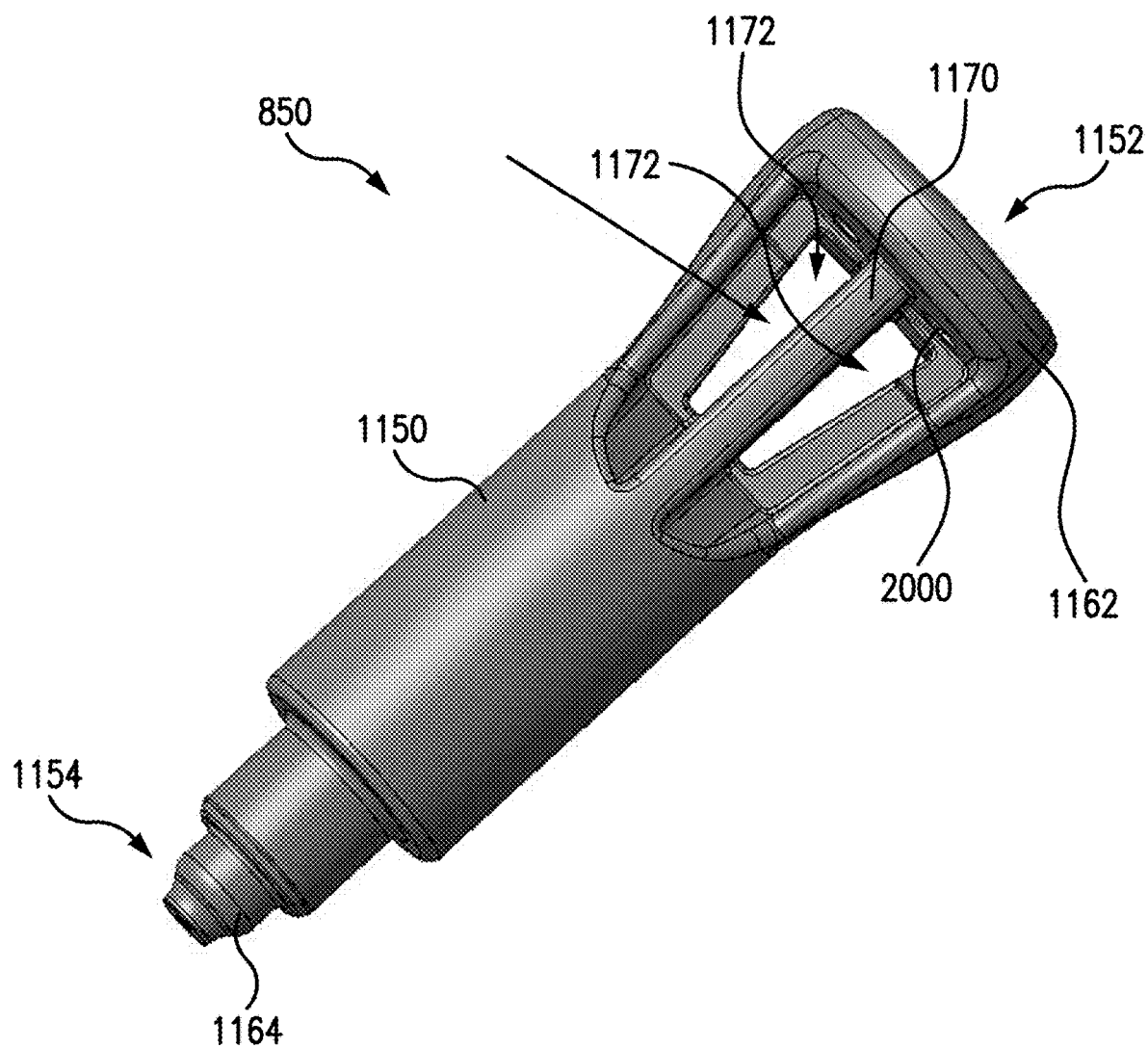
FIG. 20 illustrates another elevated perspective view of a runback of a connector assembly for a circuit breaker or other switching or protective equipment, in accordance with an embodiment.

The design of the finger cluster 860 can provide for a more compact connector assembly, which can utilize less materials and less space in the switchgear enclosure while providing current rating (e.g., 20000 Amp) and thermal and dielectric properties sufficient for use in a medium voltage switchgear and its applications. Example performance characteristics for an example garter spring of a finger cluster, using the design described herein, are shown on the Table of FIG. 19, where "in" refers to inch, and "lbf" refers to pounds-force, FIG. 20 shows another elevated perspective view of the runback 850 with the runback body 1150. The runback body 1150 can include the first end 1152 and the second end 1154 which is opposite the first end 1152. The runback body 1150 includes the base 1162 at the first end 1152 and the tip 1164 at the second end 1154, and generally tapers from the first end 1152 to the second end 1154. The runback body 1150 also includes a ventilation area(s) around the first end 1152. The ventilation area(s) is formed by a wall 1170, which divides an opening into two openings 1172 that extend through the body 1150. In this example, the two openings 1172 are symmetrical along a horizontal or longitudinal axis of the body 1150 defined by the wall 1170. The ventilation area(s) facilitate the cooling of the runback 860 during operation thereof (e.g., live connection). As further shown in FIG. 20, the base 1162 can include one or more holes 2000 for connecting the base of the runback to a conductor of a circuit breaker (or other switching or protective equipment) using one or more fastener (e.g., screws, bolts, etc.).

As shown in FIGS. 21 and 22, an insulating epoxy resin/paint can be applied to cover portions of the runback body 1150, which otherwise would be exposed when the base 1162 and the tip 1164 are connected to a circuit breaker and a finger cluster (e.g., 860), respectively. For example, all of the external surface of the runback body 1150 can be covered with a black insulating epoxy resin/paint, except for the portion 2100 (of the base 1162) which is connected to the circuit breaker (or a conductor thereof) as shown in FIG. 21 and the tip 1164 as shown in FIG. 22. Sheet metal sides may also be covered with an insulating epoxy resin/paint.

Figure 23:
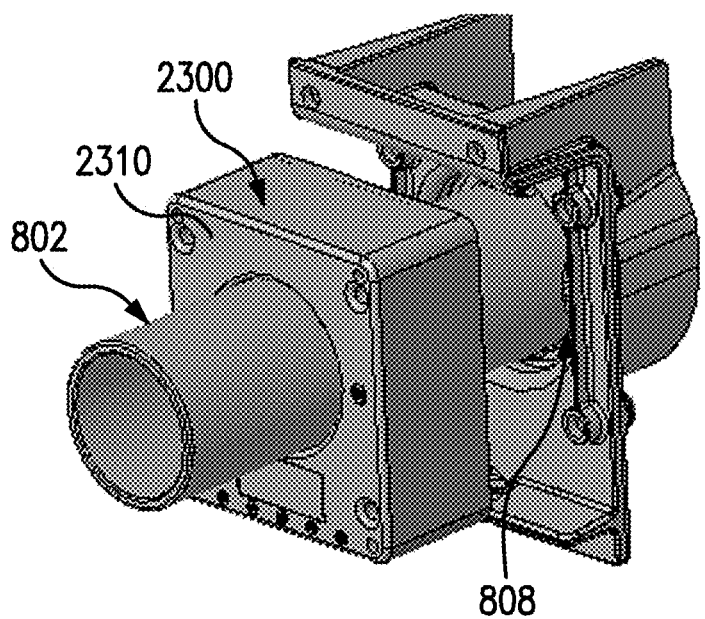
FIG. 23 illustrates an example insulator sleeve for housing a primary stab bus and a current transformer (CT) for monitoring current on the primary stab bus, in accordance with an embodiment.

FIG. 23 illustrates an example insulator sleeve 802 for housing a primary stab bus or conductor 800 (not shown) and a current transformer (CT) 2300 for monitoring current on the primary stab bus. The current transformer 2300 includes a current transformer coil housed in an insulating enclosure 2310. The enclosure 2310 can take the form of a box-shape (e.g., square or rectangular box), with a central opening therethrough to receive a portion of the insulator sleeve 802 which supports the current transformer 2300 and is surrounded by the current transformer 2300. The current transformer coil, which is proximate to an encapsulating insulator portion 808 of the insulator sleeve 802, has a location separated by a distance, for example of at least 12 millimeters, from the encapsulating insulator portion 808 of the insulator sleeve 802, to thereby reduce occurrence of partial discharges in the insulator sleeve.

Figure 24:
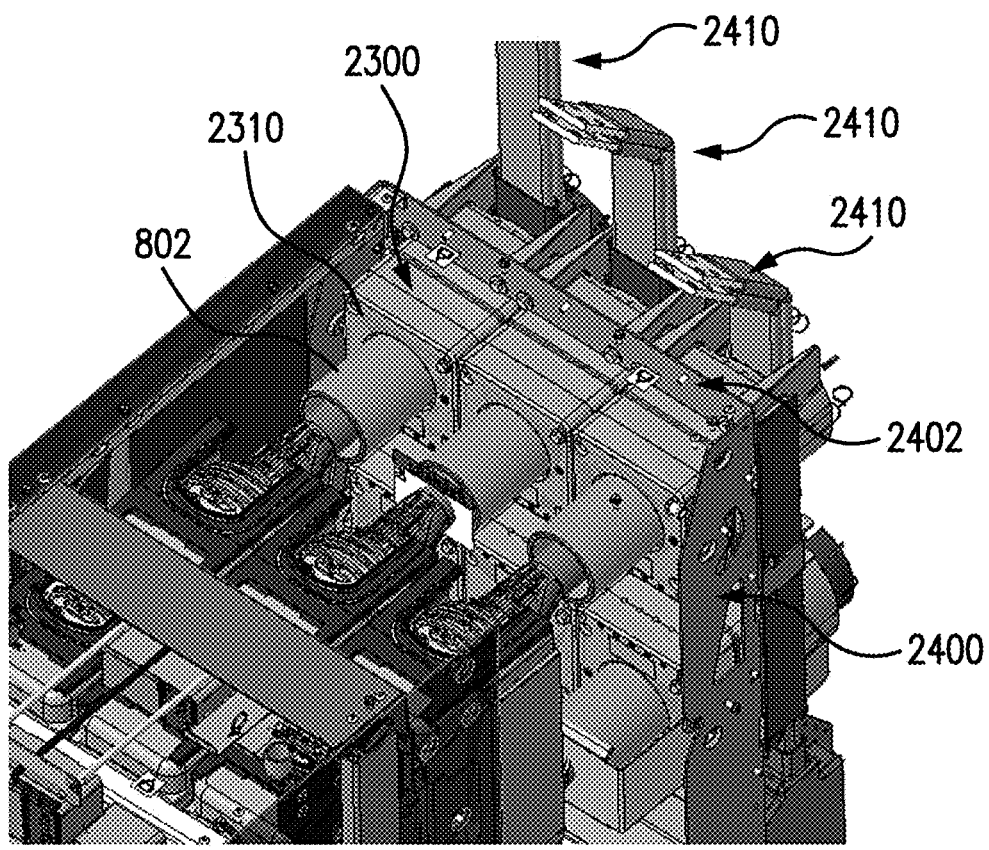
FIG. 24 illustrates a top perspective view of a portion of a breaker compartment, such as a cubicle, with a back wall having mounted thereon upper and lower rows of insulator sleeves for the load and line bus stabs and current transformer for each insulator sleeve, in accordance with an embodiment.

FIG. 24 illustrates a top perspective view of a portion of a breaker cubicle 2400 with a back wall 2402 having mounted thereon upper and lower rows of insulator sleeves 802 for the load and line stab buses. In this example for a three-phase power distribution system, there are three upper insulator sleeves 802 for housing one of the load stab buses and line stab buses, and three lower insulator sleeves 802 for housing the other one of the load stab buses and line stab buses. Each of the insulator sleeves 802 has a corresponding current transformer 2300 arranged thereon. The CT enclosures 2310 of the current transformers 2300 form a barrier between the circuit breaker and the cable/buses as well as the equipment in other adjacent compartments. As further shown in FIG. 24, respective line or load buses 2410 are connected to respective stab buses housed in the insulator sleeves 802, and can be shielded for medium voltage application (e.g., MV shielded cables).

Figure 25:
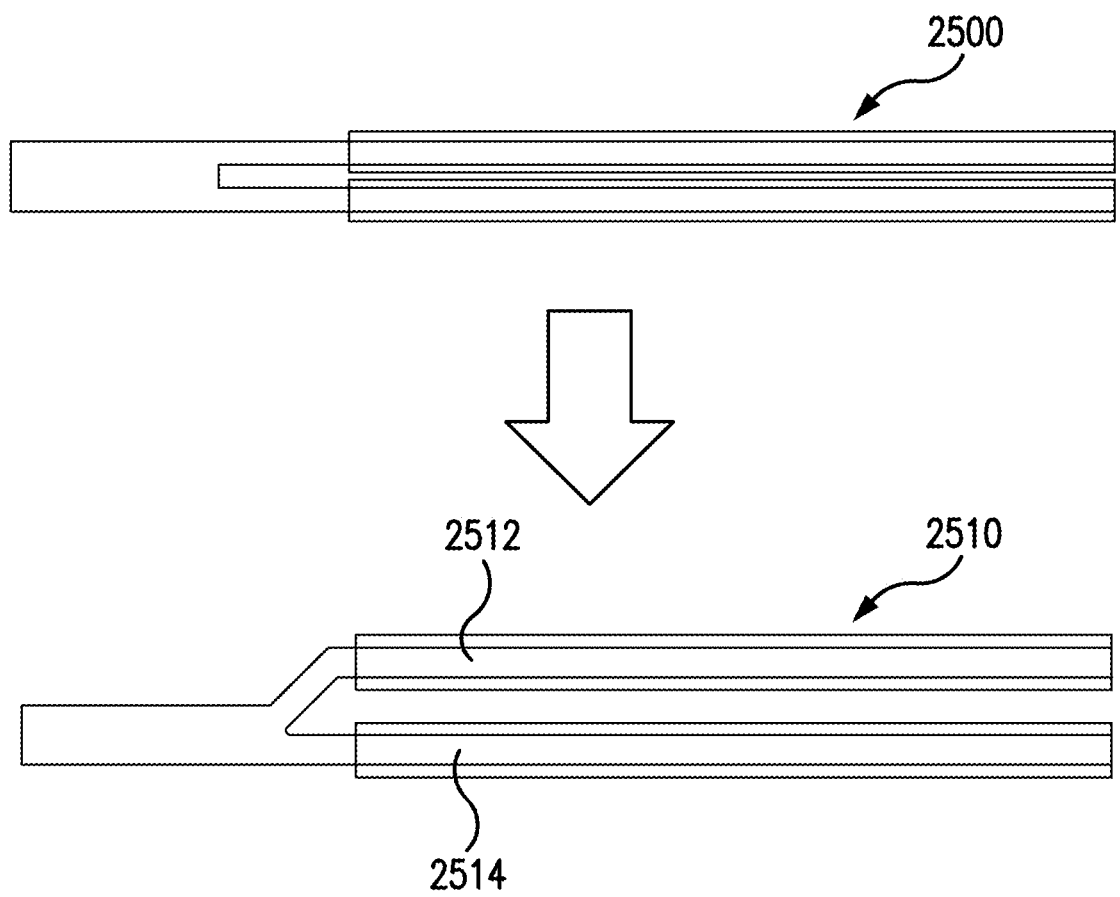
FIG. 25 illustrates an example of an improved design for a bus, which has been modified to provide greater spacing or separation between two conductors (or conductive laminations) of the bus, in accordance with an embodiment.

FIG. 25 illustrates an example of an improved design of a bus 2510, which has been modified to provide greater spacing or separation between two conductors 2512 and 2514 (in comparison to the design for the bus 2500) in order to increase or maximize heat dissipation. By controlling spacing and size of conductors, a multiple-lamination bus assembly (such as for a load bus, risers of a line bus, main-through bus or other bus) can be provided using less materials and less space in the switchgear enclosure for MV switchgear applications or other current applications. An example of an improved bus assembly is shown in FIGS. 26 and 27.

Figure 26:
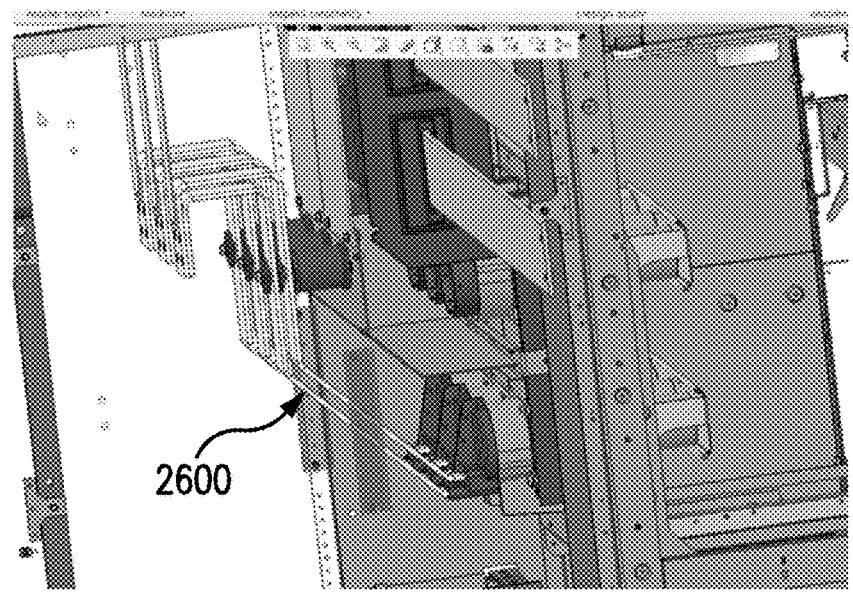
FIGS. 26 and 27 illustrate views of a bus assembly for a load bus with multiple conductive laminations or conductors, in accordance with an embodiment.
Figure 27:
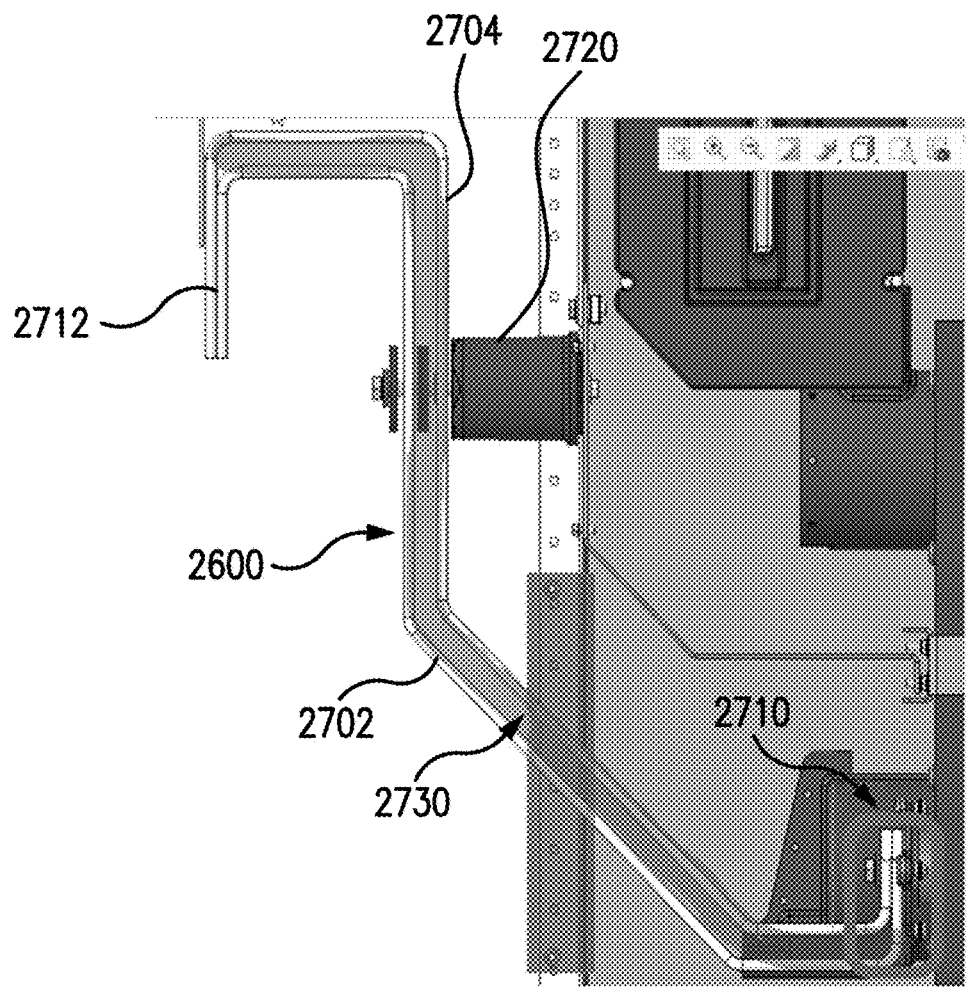

FIGS. 26 and 27 illustrate a bus assembly for a multi-lamination load bus 2600, in accordance with an embodiment. In this example, the load bus 2600 has two conductors 2702 and 2704, with their end portions connected to (or in contact with) each other at opposite ends 2710 and 2712 of the load bus 2600. One end 2710 of the load 2600 is connected, for example, to a load stab bus which, in turn, is connectable to a circuit breaker or other device of a switchgear. Another portion of the load bus 2600 is connected to a stab bus 2720 for supplying power to a load(s). As further shown in FIG. 26, in a middle portion or region between the ends 2710 and 2712, the conductors 2702 and 2704 are separated from each other and are substantially parallel to each other to provide for increased heat dissipation. To save additional space and materials, a section 2730 of the middle portion or region can run diagonally. The design of the load bus 2600 provides a compact bus assembly, which can be employed for MV switchgear applications. The general design of the load bus 2600 can also be employed with any multi-lamination bus to improve heat dissipation, while providing sufficient current rating, for MV switchgear applications.

Figure 28:
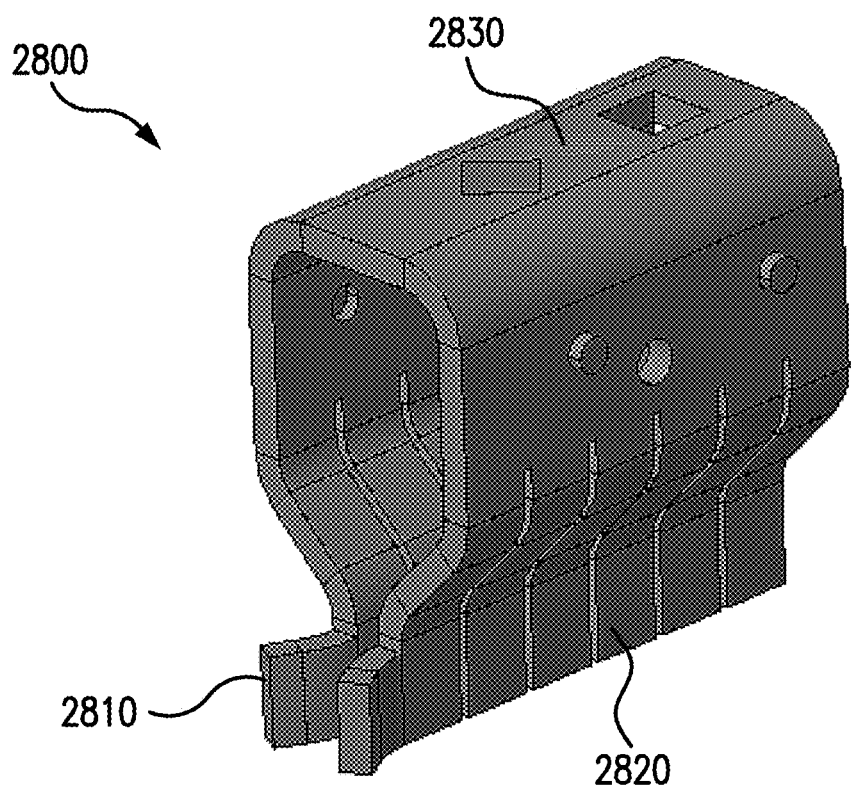
FIGS. 28 and 29 illustrate an example breaker ground shoe for connecting a circuit breaker or other switching or protective equipment to ground, in accordance with an embodiment.
Figure 29:
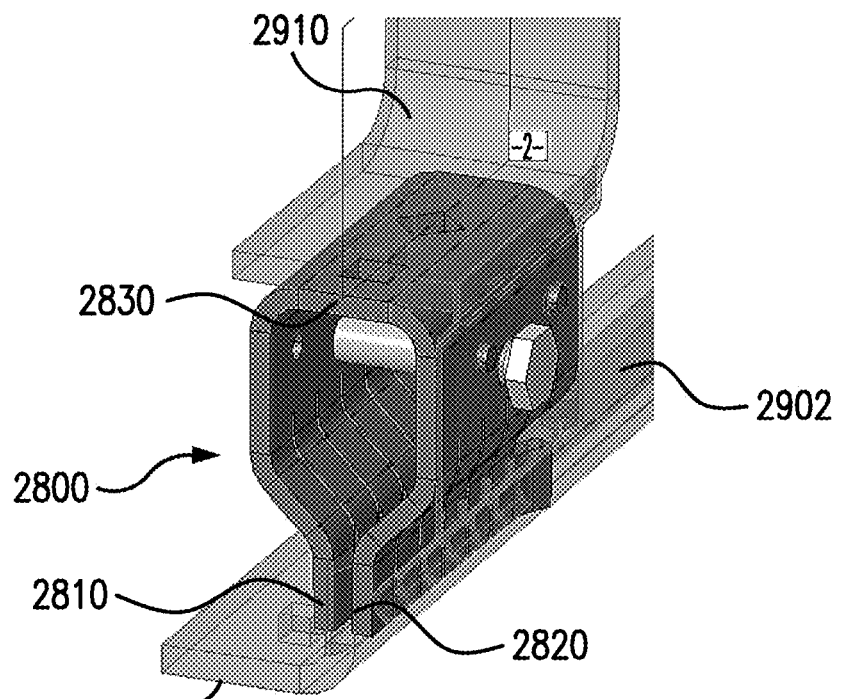

FIGS. 28 and 29 illustrate an example breaker ground shoe 2800 for connecting a circuit breaker or other switching or protective equipment to ground, in accordance with an embodiment. The breaker ground shoe 2800 can have a U-shape cross-section with two open-ends 2810 and 2820 tapering toward each other. As shown in FIG. 29, the two open-ends 2810 and 2820 are configured to connect to a ground bus 2900, and a closed end 2830 (which is opposite from the two-open ends 2810 and 2820) is configured to connect to a conductor 2910 from the circuit breaker or other switching or protective equipment using fasteners (e.g., screws, bolts, etc.). The ground bus 2900 which includes an extending rail 2902 for receiving the two open-ends 2810 and 2820 of the breaker ground shoe 2900. The rail 2902 can be clamped between the two open-ends 2810 and 2820 when the breaker ground shoe 2800 is engaged onto the ground bus 2900. The ground bus 2900 can include a 14 gauge enclosure. The design of the breaker ground shoe 2800 can provide for improved heat dissipation.

Figure 30:
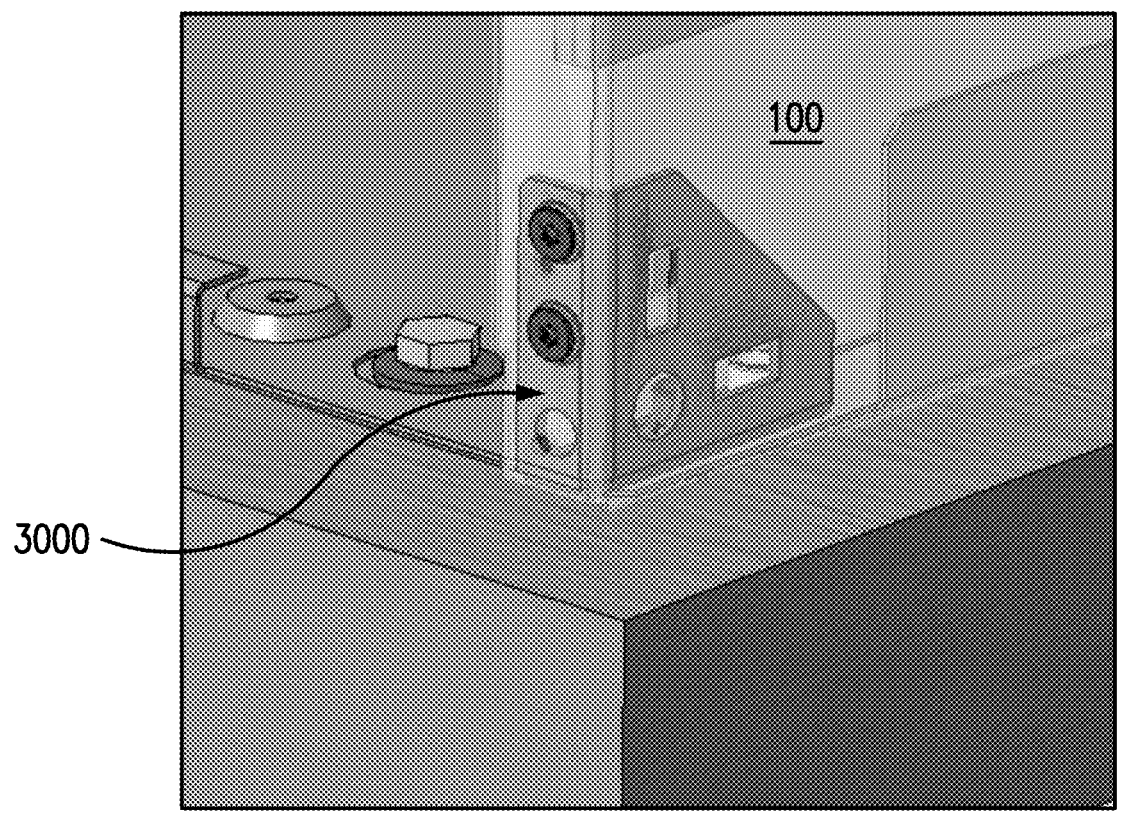
FIG. 30 illustrates an example gusset kit connected to a bottom corner of an interior wall of a switchgear enclosure or compartment thereof using fasteners, in accordance with an embodiment.

FIG. 30 illustrates an example gusset kit 3000 connected to a bottom corner of an interior wall of the switchgear enclosure 100 (or compartment thereof) using fasteners (e.g., screws, bolts, etc.). The gusset kit 3000 can add rigidity and strength to the enclosure 100 to protect against seismic activity.

Figure 31:
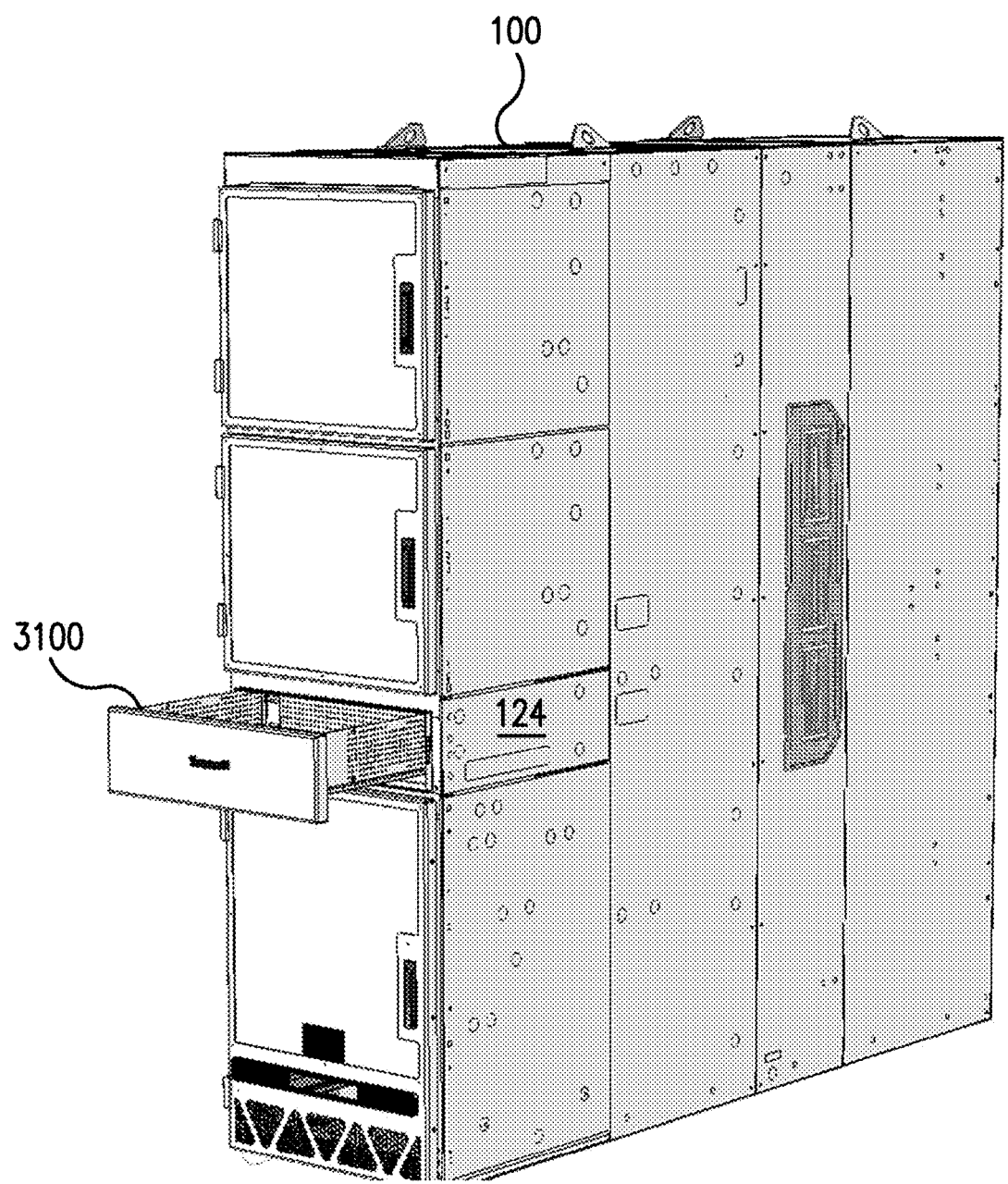
FIG. 31 illustrates an example of a low voltage drawer for housing low voltage equipment in a low voltage compartment, such as a cubicle, of the switchgear enclosure, in accordance with an embodiment.

FIG. 31 illustrates an example of a low voltage drawer 3100 for housing low voltage equipment in a compartment, such as a low voltage cubicle 124 of the switchgear enclosure 100, in accordance with an embodiment. The low voltage cubicle 124 (or other compartments) can have removable low voltage panels, terminal blocks in the top wireway, and can have auxiliary equipment inserted into the cubicle at an end (or end region). The enclosure 100 or compartments thereof can be configured to insert auxiliary equipment and a breaker cradle into an existing 26 inch retro-fill compartment, such as a cubicle, with minimal assembly.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A connector assembly for facilitating a live connection of a switching or protective equipment in a switchgear assembly, the connector assembly comprising:
   at least two circular plates, which are formed of a conductive material and spaced apart from one another;
   a plurality of fingers which are formed of a conductive material and are arranged and spaced apart around the at least two circular plates to form a finger cluster with a first open-end on a first cluster end and a second open-end on an opposite second cluster end, the first and second open-ends each being configured to receive a conductor therein, each of the plurality of fingers including:
   a first finger end and an opposite second finger end which form respective first and second cluster ends,
   at least two interior grooves which are spaced-apart on an interior surface, each of the at least two first interior grooves being configured to receive a portion of a respective one of the at least two circular plates, and
   first and second exterior grooves on an exterior surface, the first and second exterior grooves being positioned at the first and second finger ends respectively; and
   first and second garter springs which are arranged around the plurality of fingers in a respective one of the first and second exterior grooves of each of the plurality of fingers to apply a force against the plurality of fingers,
   wherein each of the plurality of fingers includes two protruding portions which extend toward an internal cavity of the finger cluster and include a contact surface, one of the two protruding portions being arranged between a first one of the at least two interior grooves and the first finger end, another one of the two protruding portions being arranged between a second one of the at least two interior grooves and the second finger end,
   wherein each of the plurality of fingers further includes an interior region with the at least two interior grooves, the interior region extending further than the two protruding portions toward the internal cavity of the finger cluster, and each of the fingers is symmetrical about a center of each of the fingers between the first and second finger ends, the center running from the interior surface to the exterior surface.

2. The connector assembly of claim 1, wherein the finger cluster is configured to make at least a three-point contact with the conductor engaged therein through the first or second open-end, via the contact surfaces of the plurality of fingers.

3. The connector assembly of claim 1, wherein the conductor is a runback having a first runback end and an opposite second runback end, one of the first and second runback ends being configured to engage the finger cluster through one of the first and second open-ends of the finger cluster, another one of the first and second runback ends being connected to another conductor leading to switching or protective circuitry of the switching or protective equipment.

4. The connector assembly of claim 3, wherein the runback includes a plurality of open ventilation areas at the another one of the first and second runback ends.

5. The connector assembly of claim 4, wherein the runback is formed by metal casting and two of the open ventilation areas which extend through the runback, the two of the open ventilation areas being symmetrical about a central longitudinal axis running from the first runback end to the second runback end.

6. The connector assembly of claim 4, wherein the runback tapers from the another one of the first and second runback ends with the open ventilation areas to the one of the first and second runback ends connected to the finger cluster.

7. The connector assembly of claim 6, wherein the finger cluster and the runback are rated for a 2,000 Amp application or for use in a MV switchgear application.

8. The connector assembly of claim 7, wherein the plurality of fingers comprises 20 fingers which are spaced apart at 22 mm around the at least two circular plates.

9. The connector assembly of claim 3, wherein the runback is covered with an epoxy resin made of an insulating material, except at locations on the first and second runback ends where the runback makes a connection to the finger cluster and the another conductor.

10. The connector assembly of claim 1, wherein the interior region comprises a middle region of a body of the finger between the first and second finger ends.

11. The connector assembly of claim 10, wherein the middle region of each of the fingers extends further toward the internal cavity of the finger cluster than the rest of the body of the finger.

12. The connector assembly of claim 10, wherein each of the interior and exterior surfaces runs along a length of each of the fingers between the first and second ends of each of the fingers, the interior surface of the middle region of each of the fingers includes the at least two interior grooves, the exterior surface of the middle region of each of the fingers includes at least an exterior portion which extends further outwards than regions of the exterior surface which run between the middle region and the first finger end of each of the fingers and between the middle region and the second finger end of each of the fingers, and the at least two interior grooves on the interior surface are opposite the at least an exterior portion on the exterior surface.

13. The connector assembly of claim 1, wherein a first end region and an opposite second end region of each of the fingers have a same shape or dimensions, the first end region including the first finger end and the first one of the two protruding portions which is closest to the first finger end, and the second end region including the second finger end and the second one of the two protruding portions which is closest to the second finger end.

* * * * *